(12) United States Patent
Givot et al.

(10) Patent No.: US 11,880,176 B2
(45) Date of Patent: *Jan. 23, 2024

(54) SYSTEMS AND METHODS FOR PRODUCT RECOMMENDATION USING PREDICTIVE MODELING

(71) Applicant: 3M INNOVATIVE PROPERTIES COMPANY, St. Paul, MN (US)

(72) Inventors: Maiken Givot, St. Paul, MN (US); Mats E. Johansson, Västervik (SE); Lothar N. Tacke, Neuss (DE); Lars M. Wistrand, Örebro (SE); John N. Willcock, West Midlands (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,719

(22) Filed: Jul. 28, 2022

(65) Prior Publication Data

US 2022/0373981 A1 Nov. 24, 2022

Related U.S. Application Data

(63) Continuation of application No. 17/250,475, filed as application No. PCT/US2019/044364 on Jul. 31, 2019, now Pat. No. 11,435,708.

(Continued)

(51) Int. Cl.
*G05B 13/04* (2006.01)
*G05B 13/02* (2006.01)

(52) U.S. Cl.
CPC ......... *G05B 13/048* (2013.01); *G05B 13/028* (2013.01); *G05B 13/042* (2013.01)

(58) Field of Classification Search
CPC ... G05B 13/048; G05B 13/028; G05B 13/042
(Continued)

(56) References Cited

U.S. PATENT DOCUMENTS

2004/0091701 A1  5/2004  Toussant
2010/0025988 A1  2/2010  Jamison
(Continued)

OTHER PUBLICATIONS

International Search Report for PCT International Application No. PCT/US2019/044364, dated Nov. 5, 2019, 4 pages.

*Primary Examiner* — Jigneshkumar C Patel
(74) *Attorney, Agent, or Firm* — Katherine M. Scholz

(57) ABSTRACT

A system and method of simulating and optimizing industrial and other processes includes a computer that performs multivariate analysis of input variables and output variables to generate a data model of the operation of the process. For industrial applications, the input variables include process variables and the output variables include result variables from the operation of the industrial process. The data model determines contributions to changes in the output or result variables by the respective input or process variables and is provided to a predictive algorithm to identify parameter values for input or process variables expected to have a most significant impact on the output or result variables during performance of the process. The outputs of the predictive algorithm are parameter values that are provided as input or process variables to the industrial process for simulation or performance optimization or product recommendations/optimizations.

15 Claims, 34 Drawing Sheets

Related U.S. Application Data

(60) Provisional application No. 62/713,025, filed on Aug. 1, 2018.

(58) Field of Classification Search
USPC .......................................................... 700/29
See application file for complete search history.

(56) References Cited

U.S. PATENT DOCUMENTS

| | | |
|---|---|---|
| 2010/0114354 A1 | 5/2010 | Lee |
| 2010/0191361 A1 | 7/2010 | McCready |
| 2011/0161257 A1 | 6/2011 | Bell |
| 2012/0123583 A1* | 5/2012 | Hazen .................. G05B 15/02 |
| | | 700/109 |

* cited by examiner

| Id | Customer | Country | Mill - machine | | | Roll profile (CVC, crown) | Roll material, IC, HiCr, HSS |
|---|---|---|---|---|---|---|---|
| | | | Mill type Hot/Cold | Machine | WR or BUR Roll | | |
| 1 | Customer A | Country A | Hot | Pomini | WR | crown | HSS |
| 2 | Customer A | Country A | Hot | Pomini | WR | crown | HSS |
| 3 | Customer A | Country A | Hot | Pomini | WR | crown | HSS |
| 4 | Customer A | Country A | Hot | Pomini | WR | crown | IC |
| 5 | Customer A | Country A | Hot | Pomini | WR | crown | IC |
| 6 | Customer A | Country A | Hot | Pomini | WR | crown | IC |
| 7 | Customer A | Country A | Hot | Pomini | WR | crown | IC |
| 8 | Customer A | Country A | Hot | Pomini | WR | crown | IC |
| 9 | Customer A | Country A | Hot | Pomini | BUR | | |
| 10 | Customer A | Country A | Hot | Pomini | BUR | | |
| 13 | Customer B | Country B | Hot | Waldrich | WR | | IC |
| 14 | Customer B | Country B | Hot | Waldrich | WR | | IC |
| 15 | Customer B | Country B | Hot | Waldrich | WR | | IC |
| 16 | Customer B | Country B | Hot | Waldrich | WR | | HSS |
| 17 | Customer C | Country C | Hot | Pomini | WR | CVC | HSS |
| 18 | Customer C | Country C | Hot | Pomini | WR | CVC | HSS |
| 19 | Customer C | Country C | Hot | Pomini | WR | CVC | HSS |
| 20 | Customer C | Country C | Hot | Pomini | WR | CVC | HSS |
| 21 | Customer C | Country C | Hot | Pomini | WR | CVC | HSS |
| 22 | Customer C | Country C | Hot | Pomini | WR | CVC | HSS |
| 23 | Customer C | Country C | Hot | Pomini | WR | CVC | HiCr |
| 24 | Customer C | Country C | Hot | Pomini | WR | CVC | HiCr |
| 25 | Customer C | Country C | Hot | Pomini | WR | CVC | IC |
| 26 | Customer C | Country C | Hot | Pomini | WR | CVC | IC |
| 27 | Customer C | Country C | Hot | Pomini | WR | CVC | IC |
| 28 | Customer C | Country C | Hot | Pomini | WR | CVC | IC |
| 29 | Customer C | Country C | Hot | Pomini | WR | CVC | IC |
| 30 | Customer D | Country D | Hot | Waldrich | WR | CVC | IC |
| 31 | Customer D | Country D | Hot | Waldrich | WR | straight | IC |
| 32 | Customer D | Country D | Hot | Waldrich | WR | straight | IC |
| 33 | Customer D | Country D | Hot | Waldrich | WR | CVC | HSS |
| 34 | Customer D | Country D | Hot | Waldrich | WR | straight | IC |
| 35 | Customer E | Country E | Hot | Meuselwitz | WR | | HSS |

FIG. 4C

| Roll diameter (mm) | Roll width (mm) | Wheel | | | | | Wheel speed (m/s) | Roll speed (m/min) |
|---|---|---|---|---|---|---|---|---|
| | | Wheel diameter (mm) | Wheel width (mm) | Grit | Hardness | Bond | | |
| 661.146 | 1900 | 910.44 | 150 | 36 | L10 | BYY | 43 | 98 |
| 661.174 | 1900 | 907.14 | 150 | 36 | L10 | BYY | 43 | 98 |
| 653.170 | 1900 | 915.63 | 150 | 36 | L10 | BYY | 44 | 70 |
| 561.223 | 1900 | 897.39 | 150 | 36 | L10 | BYY | 43 | 83 |
| | 1900 | 896.26 | 150 | 36 | L10 | BYY | 43 | 0 |
| | 1900 | | 150 | 36 | L10 | BYY | 43 | 0 |
| | 1900 | | 150 | 36 | L10 | BYY | 43 | 0 |
| | 1900 | | 150 | 36 | L10 | BYY | 43 | 0 |
| 1,426.101 | 1500 | 893.87 | 150 | 36 | L10 | BYY | 43 | 85 |
| 1,426.629 | 1500 | 894.89 | 150 | 36 | L10 | BYY | 45 | 81 |
| 669.958 | 1925 | 908.12 | 100 | 36 | L10 | BYY | 45 | 63 |
| 674.300 | 1925 | 900.04 | 100 | 36 | L10 | BYY | 45 | 64 |
| 667.412 | 1925 | 917.97 | 100 | 36 | L10 | BYY | 30 | 73 |
| 643.436 | 1925 | 908.29 | 100 | 36 | L10 | BYY | 45 | 61 |
| 784.529 | 2500 | 915.35 | 100 | 36 | L10 | BYY | 42 | 79 |
| 784.758 | 2500 | 912.89 | 100 | 36 | L10 | BYY | 45 | 79 |
| 742.631 | 2500 | 911.72 | 100 | 36 | L10 | BYY | 45 | 75 |
| 743.374 | 2500 | 909.34 | 100 | 36 | L10 | BYY | 45 | 75 |
| 825.197 | 2500 | 908.13 | 100 | 36 | L10 | BYY | 45 | 83 |
| 824.570 | 2500 | 906.93 | 100 | 36 | L10 | BYY | 45 | 83 |
| 789.031 | 2500 | 905.92 | 100 | 36 | L10 | BYY | 45 | 79 |
| 754.546 | 2500 | 902.48 | 100 | 36 | L10 | BYY | 45 | 76 |
| 683.404 | 2500 | 860.35 | 100 | 36 | L10 | BYY | 42 | 67 |
| 683.300 | 2500 | 858.63 | 100 | 36 | L10 | BYY | 45 | 67 |
| 725.785 | 2500 | 856.52 | 100 | 36 | L10 | BYY | 45 | 71 |
| 725.715 | 2500 | 855.11 | 100 | 36 | L10 | BYY | 45 | 71 |
| 649.185 | 2500 | 854.13 | 100 | 36 | L10 | BYY | 45 | 63 |
| 616.110 | 2120 | 879.00 | 100 | 36 | M10 | BWW | 37 | 103 |
| 668.270 | 2120 | 877.00 | 100 | 36 | M10 | BWW | 45 | 105 |
| 668.420 | 2120 | 876.00 | 100 | 36 | M10 | BWW | 40 | 105 |
| 685.950 | 2120 | 860.00 | 100 | 36 | M10 | BWW | 42 | 97 |
| 668.420 | 2120 | 876.00 | 100 | 36 | M10 | BWW | 40 | 105 |
| 294.580 | 600 | 899.43 | 100 | 36 | L8 | BYY | 25 | 56 |
 
*FIG. 4D*

| Grinding parameters | | | | | | | Results after grinding |
|---|---|---|---|---|---|---|---|
| Table speed (mm/min) | Cont infeed (mm/min) | End infeed (mm) | Chip thickness | Specific material removal rate Q'w (mm3/mm/s) | qs Speed ratio wheel/roll | Overlap ratio | Gratio |
| 5000 | 0.020 | 0.040 | 0.0055 | 77 | 26 | 1.41 | 1.93 |
| 5000 | 0.020 | 0.040 | 0.0055 | 77 | 26 | 1.41 | 1.77 |
| 4000 | 0.020 | 0.040 | 0.0045 | 58 | 38 | 1.28 | 1.95 |
| 4000 | 0.010 | 0.030 | 0.0320 | 48 | 31 | 1.76 | 2.51 |
| 4000 | 0.010 | 0.030 | | | | | 3.19 |
| 4000 | 0.010 | 0.030 | | | | | 2.56 |
| 4000 | 0.010 | 0.030 | | | | | 2.69 |
| 4000 | 0.010 | 0.030 | | | | | 2.54 |
| 2800 | 0.040 | 0.020 | 0.0029 | 63 | 33 | 0.96 | 8.74 |
| 2800 | 0.050 | 0.020 | | | | | 9.11 |
| 2900 | 0.160 | | 0.0068 | 112 | 43 | 1.03 | 3.52 |
| 2900 | 0.160 | | 0.0068 | 112 | 42 | 1.03 | 6.76 |
| 3400 | 0.025 | | 0.0016 | 17 | 25 | 1.03 | 5.50 |
| 2900 | 0.050 | | 0.0021 | 34 | 45 | 1.03 | 1.67 |
| 2800 | 0.070 | 0.050 | 0.0075 | 148 | 32 | 1.14 | 2.56 |
| 2800 | 0.070 | 0.050 | 0.0070 | 148 | 34 | 1.14 | 3.90 |
| 2800 | 0.070 | 0.050 | 0.0070 | 140 | 36 | 1.14 | 2.63 |
| 2800 | 0.070 | 0.050 | 0.0070 | 140 | 36 | 1.14 | 2.95 |
| 2800 | 0.070 | 0.060 | 0.0076 | 169 | 33 | 1.14 | 3.59 |
| 2800 | 0.070 | 0.060 | 0.0076 | 169 | 33 | 1.14 | 3.35 |
| 2800 | 0.070 | 0.060 | 0.0076 | 162 | 34 | 1.14 | 1.86 |
| 2800 | 0.070 | 0.060 | 0.0076 | 155 | 36 | 1.14 | 5.33 |
| 2800 | 0.070 | 0.050 | 0.0075 | 125 | 38 | 1.11 | 5.19 |
| 2800 | 0.070 | 0.060 | 0.0076 | 136 | 41 | 1.11 | 4.23 |
| 2800 | 0.070 | 0.060 | 0.0076 | 144 | 38 | 1.11 | 6.40 |
| 2800 | 0.070 | 0.060 | 0.0076 | 144 | 38 | 1.11 | 8.85 |
| 2800 | 0.070 | 0.060 | 0.0076 | 129 | 43 | 1.11 | 4.04 |
| 5000 | 0.100 | 0.000 | 0.0057 | 72 | 22 | 1.06 | 3.64 |
| 4000 | 0.070 | 0.000 | 0.0033 | 65 | 26 | 1.25 | 4.04 |
| 4500 | 0.070 | 0.000 | 0.0037 | 58 | 26 | 1.11 | 4.05 |
| 4000 | 0.020 | 0.010 | 0.0020 | 33 | 26 | 1.13 | 2.71 |
| 4000 | 0.100 | 0.000 | 0.0053 | 93 | 23 | 1.25 | 4.05 |
| 3000 | | | | | 27 | 2.00 | 1.58 |

FIG. 6

| | | Aluminium/Brass/Bronze | | | | | Carbon Steel/Cast Iron | | | | | |
|---|---|---|---|---|---|---|---|---|---|---|---|---|
| Machines | | Robotics | Back stand | Centreless Through feed | Portable Belt | Wide Belt | Stroke Sander | Robotics | Back stand | Centreless Through feed | Portable Belt | Wide Belt | Stroke Sander |
| Application | Typical Grades | | | | | | | | | | | | |
| Gate Removal/Heavy Deflashing | 20+ - 60+ | A B | A B | | B C | B C | B C | | | | | B C | B C |
| Scale removal | 36+ - 80+ | B C | B C | B C | B C | B C | B C | C B | C B | | B | B C | B |
| Pipe notching | 60+ - 80+ | B C | B C | B C | B C | B C | | B | B | B | B | | |
| Weld grinding, Corner radiusing | 60+ - 120+ | B C | B C | B C | B C | B C | B C | B | B | B C | E B | B C | B |
| Bevelling | 36+ - 120+ | B C | B C | | B C | B C | | B | B | | | | |
| Tube deburring | 60+ - 120+ | B C | B C | B C | B C | B C | | B | B | B C | E | | E |

Cells in this colour are applications show where we can win with the best value option in white font
Cells in this colour are our best options but are applications where we may struggle to show value
Cells in this colour are applications that are considered an unlikely application with this machine/substrate
Cells in this colour are applications that are not possible so no recommendations are made

*FIG. 15*

| | | Typical Grades | Aluminum/Brass/Bronze | | | | | | Carbon Steel/Cast Iron | | | | | |
|---|---|---|---|---|---|---|---|---|---|---|---|---|---|---|
| | | | Robotics | Back stand | Centerless Through feed | Portable Belt | Wide Belt | Stroke Sander | Robotics | Back stand | Centerless Through feed | Portable Belt | Wide Belt | Stroke Sander |
| 41 | H | 80+ - 180+ Intermediate finishing/blending | 5 | 3 | 3 | 3 | 3 | 3 | 12 | 7 | 7 | 7 | 3 | 7 |
| 42 | 3F | 80+ - 180+ Intermediate finishing/blending | 3 | 5 | 3 | 5 | 5 | 5 | 7 | 9 | 7 | 9 | 5 | 9 |
| 43 | G | 80+ - 180+ Intermediate finishing/blending | 3 | 3 | 5 | 3 | 3 | 3 | 7 | 7 | 9 | 7 | 3 | 7 |
| 44 | N | CRS - SFN Satin finishing/blending | 12 | 12 | 12 | 7 | 5 | 7 | 5 | 5 | 5 | 5 | 5 | 5 |
| 45 | N | CRS - SFN Satin finishing/blending | 9 | 9 | 9 | 9 | 5 | 9 | 5 | 5 | 5 | 5 | 5 | 5 |
| 46 | P | CRS - SFN Satin finishing/blending | 7 | 7 | 7 | 12 | 3 | 7 | 3 | 3 | 3 | 3 | 3 | 3 |
| 47 | Q | CRS - SFN Satin finishing/blending | 7 | 7 | 7 | 7 | 5 | 12 | 3 | 3 | 3 | 3 | 3 | 3 |
| 48 | SN | CRS - VFN Weld cleaning | 12 | 12 | 12 | 7 | 5 | 7 | 9 | 9 | 9 | 7 | 5 | 7 |
| 49 | O | CRS - VFN Weld cleaning | 7 | 7 | 7 | 7 | 3 | 7 | 7 | 7 | 7 | 7 | 3 | 7 |
| 50 | P | CRS - VFN Weld cleaning | 7 | 7 | 7 | 7 | 3 | 12 | 7 | 7 | 7 | 7 | 3 | 7 |
| 51 | Q | CRS - VFN Weld cleaning | 7 | 7 | 7 | 7 | 3 | 7 | 7 | 7 | 7 | 7 | 3 | 9 |
| 52 | I | 180+- P600 Fine/Pre-plate/pre-polish finishing | 5 | 5 | 3 | 3 | 5 | 3 | 7 | 7 | 3 | 7 | 3 | 7 |
| 53 | J | 180+- P600 Fine/Pre-plate/pre-polish finishing | 3 | 3 | 5 | 5 | 3 | 3 | 7 | 7 | 3 | 7 | 3 | 7 |
| 54 | 2K | 180+- P600 Fine/Pre-plate/pre-polish finishing | 3 | 3 | 3 | 12 | 5 | 5 | 12 | 12 | 3 | 12 | 3 | 12 |
| 55 | L | 180+- P600 Fine/Pre-plate/pre-polish finishing | 3 | 3 | 3 | 3 | 3 | 3 | 7 | 7 | 5 | 7 | 3 | 7 |
| 56 | G | 180+- P600 Fine/Pre-plate/pre-polish finishing | 3 | 3 | 3 | 3 | 3 | 3 | 7 | 7 | 5 | 7 | 3 | 7 |
| 57 | | 36+ - P400 General Purpose | 7 | 7 | 7 | 7 | 7 | 7 | 7 | 7 | 7 | 7 | 7 | 7 |

*for belt sanders and match & finishing type machines

| Machines | | Aluminum/Brass/Bronze | | | | | Carbon Steel/Cast Iron | | | | | Titanium | | | | | |
|---|---|---|---|---|---|---|---|---|---|---|---|---|---|---|---|---|---|
| | | Robotics | Back stand | Centerless/Through feed | Portable Belt | Wide Belt | Stroke Sander | Robotics | Back stand | Centerless/Through feed | Portable Belt | Wide Belt | Stroke Sander | Robotics | Back stand | Centerless/Through feed | Portable Belt | Wide Belt | Stroke Sander |
| Typical Gr | | | | | | | | | | | | | | | | | | |
| B | 36+-80+ | B | B | B | B | B/C | B | B | B | B | B | B/C | B | B | B | B | B | D/C | D |
| | 36+-80+ | 9 | 9 | 9 | 9 | 5 | 9 | 9 | 9 | 9 | 9 | 5 | 9 | 9 | 7 | 7 | 7 | 3 | 7 |
| C | 36+-80+ | 12 | 12 | 12 | 1 | 5 | 12 | 12 | 12 | 12 | 12 | 5 | 12 | 9 | 9 | 9 | 9 | 5 | 9 |
| D | 36+-80+ | 7 | 7 | 7 | 7 | 3 | 7 | 7 | 7 | 7 | 7 | 3 | 7 | 12 | 12 | 12 | 12 | 5 | 12 |
| | 60+-80+ | | | | | | | | | | | | | | | | | |
| B | 60+-80+ | | B | | B | | | B | B | | B | | | B | B | | B | | |
| | 60+-80+ | | 9 | | 9 | | | 9 | 9 | | 9 | | | 9 | 9 | | 9 | | |
| C | 60+-80+ | | 12 | | 12 | | | 12 | 12 | | 12 | | | 12 | 12 | | 12 | | |
| D | 60+-80+ | | 7 | | 7 | | | 7 | 7 | | 7 | | | 7 | 7 | | 7 | | |

| Product | | Typical Grades | Substrate | Robotics | Back stand | Centreless/ Through feed | Portable Belt | Wide Belt | Stroke Sander |
|---|---|---|---|---|---|---|---|---|---|
| 117 | D | 20+ - 60+ | Stainless Steel | 7 | 7 | 0 | 7 | 1 | 7 |
| 118 | B | 36+ - 80+ | Stainless Steel | 9 | 9 | 9 | 9 | 5 | 9 |
| 119 | C | 36+ - 80+ | Stainless Steel | 12 | 12 | 12 | 12 | 5 | 12 |
| 120 | D | 36+ - 80+ | Stainless Steel | 7 | 7 | 7 | 7 | 3 | 7 |
| 121 | B | 60+ - 80+ | Stainless Steel | 9 | 9 | 0 | 9 | 0 | 0 |
| 122 | C | 60+ - 80+ | Stainless Steel | 12 | 12 | 0 | 12 | 0 | 0 |
| 123 | D | 60+ - 80+ | Stainless Steel | 7 | 7 | 0 | 7 | 0 | 0 |
| 124 | B | 60+ - 120+ | Stainless Steel | 9 | 9 | 2 | 9 | 2 | 9 |
| 125 | C | 60+ - 120+ | Stainless Steel | 12 | 12 | 2 | 12 | 2 | 12 |
| 126 | E | 60+ - 120+ | Stainless Steel | 7 | 7 | 1 | 7 | 1 | 7 |
| 127 | B | 36+ - 120+ | Stainless Steel | 9 | 9 | 0 | 9 | 0 | 0 |
| 128 | C | 36+ - 120+ | Stainless Steel | 12 | 12 | 0 | 12 | 0 | 0 |
| 129 | D | 36+ - 120+ | Stainless Steel | 7 | 7 | 0 | 7 | 0 | 0 |
| 130 | B | 60+ - 120+ | Stainless Steel | 9 | 9 | 2 | 9 | 0 | 0 |
| 131 | C | 60+ - 120+ | Stainless Steel | 12 | 12 | 2 | 12 | 0 | 0 |
| 132 | E | 60+ - 120+ | Stainless Steel | 7 | 7 | 1 | 7 | 0 | 0 |
| 133 | D | 60+ - 120+ | Stainless Steel | 7 | 7 | 1 | 7 | 0 | 0 |
| 134 | B | 60+ - 120+/A300 - A161 | Stainless Steel | 7 | 7 | 7 | 7 | 3 | 7 |
| 135 | C | 60+ - 120+/A300 - A162 | Stainless Steel | 12 | 12 | 12 | 12 | 5 | 12 |
| 136 | E | 60+ - 120+/A300 - A163 | Stainless Steel | 7 | 7 | 7 | 7 | 3 | 7 |

FIG. 20B

| Product | Typical Grades | Application | Substrate | Machine | Rating |
|---|---|---|---|---|---|
| 1 A | 20+ - 60+ | Gate Removal/Heavy Deflashing | Aluminum/Brass/Bronze | Robotics | 5 |
| 2 B | 20+ - 60+ | Gate Removal/Heavy Deflashing | Aluminum/Brass/Bronze | Robotics | 5 |
| 3 C | 20+ - 60+ | Gate Removal/Heavy Deflashing | Aluminum/Brass/Bronze | Robotics | 3 |
| 4 D | 20+ - 60+ | Gate Removal/Heavy Deflashing | Aluminum/Brass/Bronze | Robotics | 3 |
| 5 B | 36+ - 80+ | Scale Removal | Aluminum/Brass/Bronze | Robotics | 5 |
| 6 C | 36+ - 80+ | Scale Removal | Aluminum/Brass/Bronze | Robotics | 5 |
| 7 D | 36+ - 80+ | Scale Removal | Aluminum/Brass/Bronze | Robotics | 3 |
| 8 B | 60+ - 80+ | Pipe Notching | Aluminum/Brass/Bronze | Robotics | 5 |
| 9 C | 60+ - 80+ | Pipe Notching | Aluminum/Brass/Bronze | Robotics | 5 |
| 10 D | 60+ - 80+ | Pipe Notching | Aluminum/Brass/Bronze | Robotics | 3 |
| 11 B | 60+ - 120+ | Weld Grinding, Corner radiusing | Aluminum/Brass/Bronze | Robotics | 5 |
| 12 C | 60+ - 120+ | Weld Grinding, Corner radiusing | Aluminum/Brass/Bronze | Robotics | 5 |
| 13 E | 60+ - 120+ | Weld Grinding, Corner radiusing | Aluminum/Brass/Bronze | Robotics | 3 |
| 14 B | 36+ - 120+ | Bevelling | Aluminum/Brass/Bronze | Robotics | 5 |
| 15 C | 36+ - 120+ | Bevelling | Aluminum/Brass/Bronze | Robotics | 5 |
| 16 D | 36+ - 120+ | Bevelling | Aluminum/Brass/Bronze | Robotics | 3 |
| 17 B | 60+ - 120+ | Tube deburring | Aluminum/Brass/Bronze | Robotics | 5 |
| 18 C | 60+ - 120+ | Tube deburring | Aluminum/Brass/Bronze | Robotics | 5 |
| 19 E | 60+ - 120+ | Tube deburring | Aluminum/Brass/Bronze | Robotics | 3 |
| 20 D | 60+ - 120+ | Tube deburring | Aluminum/Brass/Bronze | Robotics | 3 |
| 21 B | 60+ - 120+/A300 - A161 | Forging skin/casting skin/coating/defect reomval | Aluminum/Brass/Bronze | Robotics | 5 |
| 22 C | 60+ - 120+/A300 - A162 | Forging skin/casting skin/coating/defect reomval | Aluminum/Brass/Bronze | Robotics | 5 |
| 23 E | 60+ - 120+/A300 - A163 | Forging skin/casting skin/coating/defect reomval | Aluminum/Brass/Bronze | Robotics | 3 |

FIG. 21

| Marketing Header | Marketing Desc/QAD Location | 3M Legacy SKU | List Price | Product ID | Desc |
|---|---|---|---|---|---|
| ExoFit NEX | 3M DBI-SALA ExoFit NEX Arc Flash Positioning Harness 1103070, Sm, 1 ea/case | 70007411336 | | 1103070 | PVC coated aluminum back |
| ExoFit NEX | 3M DBI-SALA ExoFit NEX Arc Flash Positioning Harness 1103071, Med, 1 ea/case | 70007409405 | | 1103071 | PVC coated aluminum back |
| ExoFit NEX | 3M DBI-SALA ExoFit NEX Arc Flash Positioning Harness 1103072, Lg, 1 ea/case | 70007409413 | | 1103072 | PVC coated aluminum back |
| ExoFit NEX | 3M DBI-SALA ExoFit NEX Arc Flash Positioning Harness 1103073, X-Lg, 1 ea/case | 70007411344 | | 1103073 | PVC coated aluminum back |
| ExoFit NEX | 3M DBI-SALA ExoFit NEX Arc Flash Positioning Harness 1103074, 2X-L, 1 ea/case | 70007409421 | | 1103074 | PVC coated aluminum back |
| ExoFit NEX | 3M DBI-SALA ExoFit NEX Arc Flash Harness 1103085, Sm, 1 ea/case | 70007411351 | | 1103085 | PVC coated aluminum back |
| ExoFit NEX | 3M DBI-SALA ExoFit NEX Arc Flash Harness 1103086, Med, 1 ea/case | 70007409470 | | 1103086 | PVC coated aluminum back |
| ExoFit NEX | 3M DBI-SALA ExoFit NEX Arc Flash Harness 1103087, Lg, 1 ea/case | 70007411369 | | 1103087 | PVC coated aluminum back |
| ExoFit NEX | 3M DBI-SALA ExoFit NEX Arc Flash Harness 1103088, X-Lg, 1 ea/case | 70007411377 | | 1103088 | PVC coated aluminum back |
| ExoFit NEX | 3M DBI-SALA ExoFit NEX Arc Flash Harness 1103089, 2X-L, 1 ea/case | 70007409488 | | 1103089 | PVC coated aluminum back |
| ExoFit NEX | 3M DBI-SALA ExoFit NEX Vest-Style Harness 1113000, X-Sm, 1 ea/case | 70007419628 | | 1113000 | Aluminum back D-ring, lock |
| ExoFit NEX | 3M DBI-SALA ExoFit NEX Vest-Style Harness 1113001, Sm, 1 ea/case | 70007419636 | | 1113001 | Aluminum back D-ring, lock |
| Sold last 18mnthsUSA | | 70804437757 | | 1113001B | HARN LQC 1D SM NEX |
| ExoFit NEX | 3M DBI-SALA ExoFit NEX Vest-Style Harness 1113004, Med, 1 ea/case | 70007426243 | | 1113004 | Aluminum back D-ring, lock |
| Sold last 18mnthsUSA | | 70007426250 | | 1113004B | HARN LQC 1D MED NEX |
| ExoFit NEX | 3M DBI-SALA ExoFit NEX Vest-Style Harness 1113007, Lg, 1 ea/case | 70007419701 | | 1113007 | Aluminum back D-ring, lock |
| Sold last 18mnthsUSA | | 70007419719 | | 1113007B | HARN LQC 1D LG NEX |
| ExoFit NEX | 3M DBI-SALA ExoFit NEX Vest-Style Harness 1113010, X-Lg, 1 ea/case | 70007426276 | | 1113010 | Aluminum back D-ring, lock |
| Sold last 18mnthsUSA | | 70007680773 | | 1113010B | HARN LQC 1D XL NEX |
| ExoFit NEX | 3M DBI-SALA ExoFit NEX Vest-Style Harness 1113013, 2X-Lg, 1 ea/case | 70007419776 | | 1113013 | Aluminum back D-ring, lock |
| ExoFit NEX | 3M DBI-SALA ExoFit NEX Vest-Style Harness 1113014, 3X-Lg, 1 ea/case | 70007426300 | | 1113014 | Aluminum back D-ring, lock |
| ExoFit NEX | 3M DBI-SALA ExoFit NEX Vest-Style Climbing Harness 1113030, X-Sm, 1 ea/case | 70007426342 | | 1113030 | Aluminum back and front D- |
| ExoFit NEX | 3M DBI-SALA ExoFit NEX Vest-Style Climbing Harness 1113031, Sm, 1 ea/case | 70007419742 | | 1113031 | Aluminum back and front D- |
| ExoFit NEX | 3M DBI-SALA ExoFit NEX Vest-Style Climbing Harness 1113034, Med, 1 ea/case | 70007419875 | | 1113034 | Aluminum back and front D- |
| Sold last 18mnthsBRA | | 70008105671 | | 1113034B | HARN LQC VD 2D MED NE |
| Sold last 18mnthsCAN | | 70007702485 | | 1113034C | HARN LQC VD 2D XL NEX |
| ExoFit NEX | 3M DBI-SALA ExoFit NEX Vest-Style Climbing Harness 1113037, Lg, 1 ea/case | 70007419883 | | 1113037 | Aluminum back and front D- |
| ExoFit NEX | 3M DBI-SALA ExoFit NEX Vest-Style Climbing Harness 1113040, X-Lg, 1 ea/case | 70007419925 | | 1113040 | Aluminum back and front D- |

FIG. 24

SYSTEMS AND METHODS FOR PRODUCT RECOMMENDATION USING PREDICTIVE MODELING

CROSS-REFERENCE TO RELATED APPLICATIONS

This application is a continuation of U.S. application Ser. No. 17/250,475, filed Jan. 26, 2021, which is a national stage filing under 35 U.S.C. 371 of PCT/US2019/044364, filed Jul. 31, 2019, which claims the benefit of U.S. Provisional Application No. 62/713,025, filed Aug. 1, 2018, the disclosure of which is incorporated by reference in its entirety herein.

TECHNICAL FIELD

This application is directed to a predictive modeling tool that uses a multivariate statistical approach and predictive model to drive iterative machine learning applications for simulating and continuously optimizing industrial engineering and other applications.

BACKGROUND

For more than 25 years, spreadsheet-based modeling has been used to describe and report results for industrial applications. Such spreadsheets are typically used to note actual performance results and then to calculate cost/value estimates from the increase or decrease in cost. Reports are generated and stored by individuals, typically on local servers. However, such an approach has been found to have a low predictive or optimization capability and is not particularly useful in reaching solid conclusions.

In a sample industrial engineering application for roll grinding, for example, tech service support for roll grinding customers is made in spreadsheet files and stored in databases. It is difficult to get an objective overview of the collected data and the results. Often the report cannot be presented until after the trials by email.

This limitation is unfortunate, for the business of abrasive bonded products, for example, includes custom engineered products where a grinding wheel with 10% higher performance delivers high value in a production line. The limiting factor in such industrial systems is to handle and create a logical structure that may be understood and agreed to by the product manufacturers and the customers. In addition, three to five years are needed to become an experienced Industrial Application Engineer. If a key Industrial Application Engineer leaves a company, the performance information and operations knowledge learned on the job is typically lost.

Traditionally, physical simulations or models have been used for product simulations. By fine tuning the formula coefficients of these models, key performance indicators (KPIs), and settings, it is possible to create a data model that well describes the current knowledge. However, physical modelling requires a user to define formulas that describe the core process relations often via engineering indices and/or key performance indicators. The negative aspect of this approach is that one may only predict/simulate the relations that are already known. It is also hard to separate an outlier from a point that is new "learning," i.e., contains new information. This approach requires a company to have formula and coefficient experts that are motivated to maintain the generated physical models. Also, while such physical models tend to allow spreading of available knowledge from the knowledgeable person to a wider group, such models do not have predictive capability.

Statistical approaches have been used in the pharmaceutical industry since 1978 (Astra Hassle in Sweden) and are today approved and supported by the FDA. The chemical process industry in Sweden started to use a statistical selection approach in 1985. For the industrial application of centerless, centertype, and internal grinding, the company Tyrolit purportedly has a tool that is used to support optimization at customer sites that is used to recommend grinding tools and recommended machine settings for cylindrical grinding applications. Tyrolit has product selectors that uses logic "trees" for selection of its products. However, to date, statistical machine learning type applications have not been used for such industrial applications that permit the industrial applications to be simulated and continuously optimized.

A technical solution is desired that enables a company to maintain and to safeguard its performance data while using the performance data to provide solid predictive solutions around the world, independent of application engineers or the presence of sales representatives. It is also desired to create a logical structure that captures the performance data created during the industrial process for enabling simulation and continuous optimization of the industrial process at each customer site.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

The systems and methods described herein combine modern statistical analysis with experience in development, application engineering and sales of industrial products to develop a method for optimization and a web tool where a new model or application may be added in a very simple way without changes to web interface coding. A multivariate statistical approach is used to increase understanding of the underlying industrial processes and to facilitate communication across functional borders. In sample embodiments, the systems and methods described herein support any iterative/machine learning application to provide recommended machine parameters.

In sample embodiments, a computer-implemented method of implementing predictive modeling for industrial applications and associated processing apparatus is provided. The method includes a computer performing multivariate analysis of input variables and output variables generated during the operation of an industrial process to generate a data model of the operation of the industrial process. The input variables may include process variables and the output variables may include results from the operation of the industrial process. The resulting data model represents contributions to changes in the output variables by the respective input or process variables. The data model is provided to a predictive algorithm to identify parameter values for input or process variables expected to have a most significant impact on selected output variables during performance of the industrial process. The predictive algorithm outputs the parameter values, which are provided as the input or process variables to the industrial process to optimize the selected output variables.

In the sample embodiments, the computer generates the data model by automatically generating a Design of Experiments (DoE) design for an input variable space of the industrial process where an experimental design is processed by the data model and results are stored based on preferred results. The predictive algorithm makes predictions of a predetermined number of best next trials for the DoE and outputs parameter values for the predetermined number of best next trials and probabilities of improved results using the parameter values.

In other sample embodiments, the parameter values and output or result variables generated by the industrial process in response to the parameter values are provided as feedback data to the computer for adjustment of the data model. In the sample embodiments, the parameter values may be output to a display as a simulation of an output of the industrial process in response to specified input variables. In addition, the method may include recommending a product having parameter values that optimize for the selected output variables in the industrial process. The recommended product may optimize the selected output variables in the industrial process for at least one of a specified machine, a specified substrate, and a specified application. In other sample embodiments, the method may include identifying products in a portfolio of products that have overlapping parameter values that optimize the same selected output variables and/or identifying gaps in a portfolio of products by identifying parameter values that are not represented in the portfolio of products for optimizing the selected output variables.

The statistical methods described herein may be applied to a number of industrial processes that may be modeled using the DoE methodology. For example, the industrial process may be a grinding machine operation where the input variables comprise machine settings for a grinding machine and the output variables depending on a type of grinding process and comprise at least one of G-ratio, material removal rate of a grinding wheel, chip thickness, pieces per dressing cycle, and surface finish. In such an embodiment, the machine settings include at least one of grinding wheel speed, roll speed, traverse speed, continuous infeed, and end infeed grinding time, feed rate, shifting, dressing, dressing infeed, infeed, and overlap ratio.

In another example, the industrial process may be a product selection process such as an adhesive selection process. In this example, the input variables comprise selection variables for an adhesive or tape and the output variables comprise a selection or recommendation of at least one adhesive or tape. In sample embodiments, the input variables include at least one of adhesive physical characteristics, adhesive thermal characteristics, adhesive electrical characteristics, adhesive curing characteristics, adhesive performance characteristics, adhesive durability characteristics, adhesive chemical resistance characteristics, adhesive rheological characteristics, adhesive viscosity, adhesive setting time, adhesive modulus of elasticity, adhesive solvent resistance, adhesive composition, adhesive dispensing characteristics, adhesive use requirements, standardized tests or certifications, environmental parameters, health parameters, safety parameters, carrier characteristics, backing characteristics, liner characteristics, and materials to be bonded by the adhesive or tape. On the other hand, the output variables include at least one of tensile strength, peel strength value, adhesive name, adhesive structural characteristics, adhesive performance characteristics, quantification of quality of fit, and purchasing information. The adhesive may be a pressure sensitive adhesive with or without additional adhesive or non-adhesive layers.

In other sample embodiments, the industrial process may be a grinding operation that includes recommending a product that optimizes the selected output variables in the industrial process for at least one of a specified machine, a specified substrate, and a specified application of an abrasive belt.

In other sample embodiments, a method of implementing predictive modeling is provided in which a computer performs multivariate analysis of input variables relating to characteristics of products and output variables relating to performance of the products to generate a data model of the products. In the sample embodiments, the data model represents contributions to changes in the output variables by the respective input variables. The data model is provided to a predictive algorithm to identify parameter values for input variables expected to have a most significant impact on selected output variables. The predictive algorithm outputs the parameter values, and the parameter values are provided as the input variables to optimize the selected output variables. A product is recommended that optimizes the selected output variables for specified input variables.

In further sample embodiments, the methods include identifying products in a portfolio of products that have overlapping parameter values that optimize the same selected output variables and/or identifying gaps in a portfolio of products by identifying parameter values that are not represented in the portfolio of products for optimizing the selected output variables.

In still further sample embodiments, the input variables include characteristics of a grinding machine, a bonded abrasive grinding wheel, an abrasive belt, coated abrasive belts or disks, non-woven abrasives, bristle brushes, robot-mounted abrasive articles, an adhesive, and a safety harness. The input variables may further include process variables of an industrial process and the output variables include results from operation of the industrial process. In such embodiments, the data model represents contributions to changes in the output variables by the respective input or process variables. The parameter values are provided as the input or process variables to the industrial process to optimize the selected output variables Further embodiments include a system that implements predictive modeling to optimize an industrial process comprising at least one processor and a memory storing instructions that when executed by the at least one processor cause the at least one processor to perform operations comprising: performing multivariate analysis of input variables and output variables generated during operation of the industrial process to generate a data model of the operation of the industrial process, the input variables including process variables and the output variables including results from the operation of the industrial process and the data model representing contributions to changes in the output variables by the respective input variables; automatically generating a Design of Experiments (DoE) design for an input variable space of the industrial process; processing an experimental design using the data model; providing results of the processing the experimental design based on preferred outcome to a predictive algorithm; the predictive algorithm identifying parameter values for input variables expected to have a most significant impact on selected output variables during performance of the industrial process, making predictions of a predetermined number of best next trials for the DoE, and outputting parameter values for the predetermined number of best next trials and probabilities of improved results using the parameter values; and providing the parameter values as the input variables to the industrial process to optimize the selected output variables.

In such embodiments, the at least one processor further performs operations comprising feeding the parameter values and output variables generated by the industrial process in response to the parameter values as feedback data to the at least one processor and adjusting the data model using the feedback data. The at least one processor may further perform operations comprising outputting the parameter values to a display as a simulation of an output of the industrial process in response to specified input variables.

In other embodiments, the at least one processor may further perform operations comprising recommending a product having parameter values that optimize for the selected output variables in the industrial process and recommending the product that optimizes the selected output variables in the industrial process for at least one of a specified machine, a specified substrate, and a specified application. The at least one processor may further perform operations comprising identifying products in a portfolio of products that have overlapping parameter values that optimize the same selected output variables and/or identifying gaps in a portfolio of products by identifying parameter values that are not represented in the portfolio of products for optimizing the selected output variables.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 4C-FIG. 4E are tables that together illustrate test data for grinding applications.

FIG. 6 illustrates a sample output display showing the predicted values for the parameters of interest in a particular industrial application.

FIG. 15 illustrates a chart of sample abrasive belts by application-substrate-machine in sample embodiments.

FIG. 16B is a zoomed in version of FIG. 16A.

FIGS. 17A-17B are charts illustrating the qualitative information from FIG. 15 converted into numerical 'rankings' indicating suitability of a given machine/substrate for a particular application on a scale of 1-12.

FIGS. 20A-20B are charts illustrating the refined numerical rankings for the refined data (taking pressure into account).

FIG. 21 is a table illustrating the performance ratings for robotics machine applications and products.

FIG. 24 is a table including a product list of harness data that contains potentially hundreds of products with potentially thousands of stock keeping units (SKUs) worldwide for providing to the predictive modeling tool to provide product portfolio rationalization.

DETAILED DESCRIPTION

Figure 1:
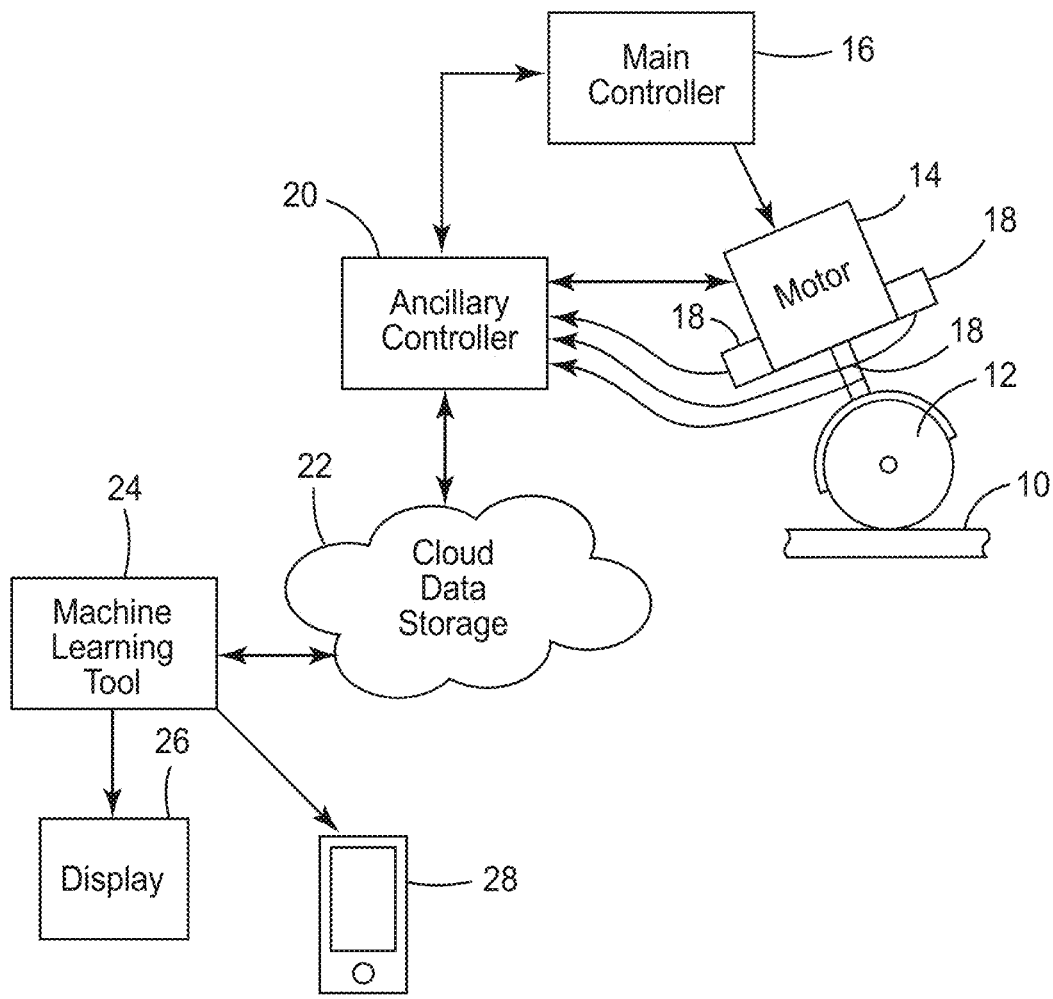
FIG. 1 illustrates a sample embodiment of a grinding application where sensors provide feedback data that is processed by a machine learning tool to generate simulation and continuous optimization data.

It should be understood at the outset that although an illustrative implementation of one or more embodiments are provided below, the disclosed systems and/or methods described with respect to FIGS. 1-26 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The methodology described below may be used for a number of industrial processes or industrial engineering applications, the rapid pricing of complex engineered products used in such industrial processes or industrial engineering applications, medical treatments, and the like. As used herein, "industrial process" or industrial engineering application" is intended to encompass a number of technological field applications including resin-bond wheels (such as roll grinding, tool or flute grinding, face grinding, rail grinding wheels, hot-pressed wheels, portable or mounted cut-off wheels, depressed center grinding wheels, cut- and grind wheels, flex wheels, cup wheels, snagging wheels), vitrified bond grinding wheels (such as gear grinding, cylindrical (ID/OD/Centerless, Cam/Crank grinding wheels, surface/creep feed grinding wheels, face grinding wheels), superabrasive grinding wheels (for tool grinding, cam/crank grinding, surface and creep feed grinding, cylindrical ID/OD, profiles, turbines and gear grinding), coated abrasive belts or disks, non-woven abrasives, bristle brushes, robot-mounted abrasive articles, adhesive selection, and even for more diverse industrial products such as safety harness products, smart filters, product recommenders and selectors, portfolio rationalizers for determining which overlapping product offerings to consolidate, applications to research and development to identify areas for targeted research, product price calculators (including value calculators), training, and the like. Samples described herein include the simulation and/or optimization of a grinding application and an interactive modeling process for selecting a correct adhesive for a particular application by collecting test data relating to input variables and materials to be bonded by the adhesive and measurable output variables. Other samples described herein include a product recommender for abrasive belts, and a portfolio optimizer and product recommender for safety harness products. The simulation, optimization, product selection, product recommendation, and portfolio optimization features may be applied to any suitable industrial process within the scope of the present disclosure.

As will be apparent from the following detailed description, the predictive modeling tool described herein addresses the above-mentioned and other technical shortcomings in the prior art by providing application engineers with a simple software application on a smartphone or handheld computer (e.g., iPad) in the field enabling them to change multiple machine parameters at the same time and to work with customers to obtain a desired outcome (e.g., performance optimization). The predictive modeling tool described herein also enables the equipment provider to build and to maintain knowledge about the operation of its equipment and to reach maximum product performance.

Industrial Engineering Application Example—Grinding Tools

FIG. 1 illustrates a sample embodiment of a grinding application where sensors provide feedback data that is processed by a machine learning tool to generate simulation and continuous optimization data. In this embodiment, a substrate 10 is ground by a grinding wheel 12 under control of a servo motor 14. In turn, the servo motor 14 is controlled by a main controller 16 that automates the operation of the servo motor 14 and grinding wheel 12. During operation, sensors 18 (e.g., speed, torque, environmental, temperature, pressure, rotation, vibration, imaging sensors, etc.) provide feedback regarding the operation of the grinding wheel 12 to an ancillary controller 20 that may, as appropriate, provide feedback control signals to the servo motor 14 and/or the main controller 16 to adjust the operation of the grinding operation based on sensor feedback. In sample embodiments, the feedback sensor data is stored during operation in cloud storage 22 and provided to a machine learning tool 24 that learns the operation of the grinding wheel 12 under different conditions. As will be explained in more detail below, the machine learning tool 24 learns the optimal operating conditions of the grinding wheel 12 for different operating conditions and wheel specifications and provides the corresponding parameters to the ancillary controller 20 and/or main controller 16 to provide continuously optimizing control during the operation of the grinding wheel 12. Also, the stored operating parameters may be used to simulate operation of the grinding wheel 12 on a display 26 in response to specified inputs. The operating parameters may also be provided to an app or web page accessible using a user's (e.g., application engineer's) smartphone or handheld computer 28 to assist the user with the setting of the control parameters for the grinding wheel 12.

Those skilled in the art of machine learning and artificial intelligence (AI) applications will appreciate that the machine learning tool learns optimized settings that evolve over time and constantly improve the grinding performance. The secured application data from all completed tests and operations is stored in the cloud data storage 22 to maintain a continuous record of the continuous optimization performed by the machine learning tool 24. It will be further appreciated that the stored simulations make product training much easier and significantly shorter for new sales reps and application engineers as well as for machine builders or end user customers for their own setup and use of the products. Such simulations also assist application engineers and/or product developers in the development of the grinding tools to a finished usable application in line with the simulations.

The test data for "training" the machine learning tool 24 is obtained by performing a number of tests of the grinding apparatus. In a test, a master data file containing 98 grinding tests for 19 instances of use of a 3M™ Cubitron™ II Resin-bond Roll Grinding Wheel containing 3M™ Precision Shaped Grain (PSG) over 29 different test occasions were used to generate a predictive data model. 83 data points and 19 variables were used in the data model with a predictive ability of Q'=0.63, which indicates a good predictive level.

A web application also has been created with an adaptable/modifiable interface to load new grinding models into the user's smartphone 28, thus providing a very rapid and simple process to add new grinding applications. Although the model only contains data based on 3M™ Cubitron™ II Resin-bond Roll Grinding Wheels, verification of the model results was made for any wheels containing crushed abrasives. Five test instances came out with +/−0, +20% and 3×>30% improvement compared to existing settings, illustrating the robustness and versatility of the modeling tool. Also, as explained below, an optimization tool has been developed that supports simultaneous change of multiple variables. This optimization tool provided a significant increase in speed of the optimization process. Such rapid optimization allows movement from the point of operation in the direction of the optimum machine setting defined by the model and calibration dataset, which decreases risk of damaging a product or machine, increases customer value by each step, and provides a safer and more stable work process. Those skilled in the art will appreciate that the optimum point is individualized for each machine/customer and may vary over time. The optimum point is reached by stepwise approach or by the limits of parameter settings in the machine.

Figure 2:
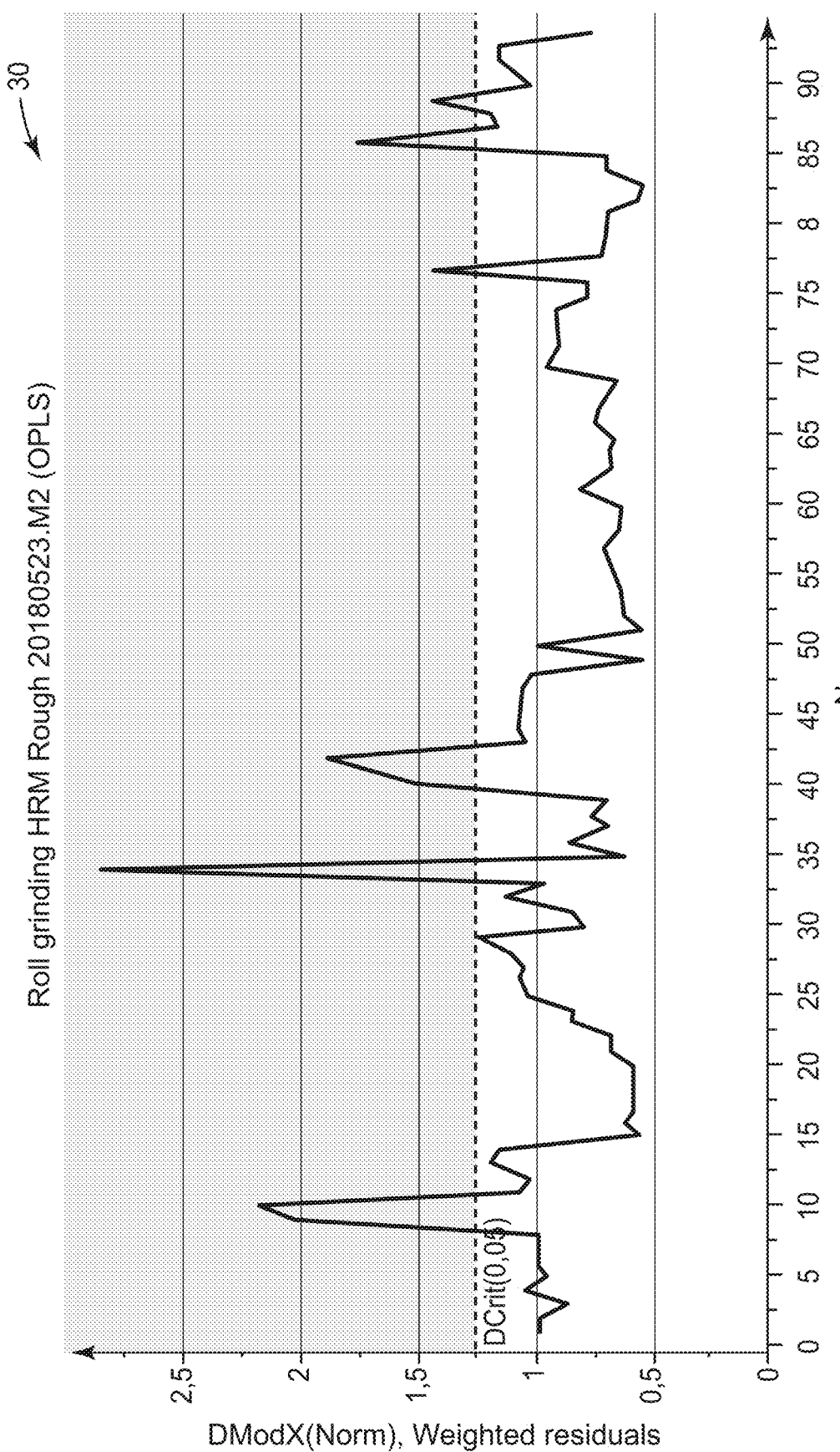
FIG. 2 is a DModX plot showing the distance of an observation in the training set to the input variables in the X model plane or hyper plane.

The gathered data may also be used to assist users of the grinding wheel 12 to validate their generated data by creating a scores plot to position the user in relation to a user database in cloud data storage 22 and to identify the most relevant test reports. The machine learning tool 24 or other processing elements in the cloud data storage 22 may then, based on the user supplied data, validate correctness of the user supplied data or settings for the maximum or best possible performance and evaluate the degree of "stretch" in the user data in relation to the user database using a distance to model plot 30 as shown in FIG. 2. FIG. 2 is a DModX plot showing the distance of an observation in the training set to the input variables in the X model plane or hyper plane. DModX is proportional to the residual standard deviation (RSD) of the input variables (X) observation. By default, DModX is displayed in normalized units, that is, the absolute DModX divided by the pooled residual standard deviation of the model. The critical value of DModX, denoted Dcrit, is computed from an F-distribution, also known as Snedecor's F distribution or the Fisher-Snedecor distribution which is, in probability theory and statistics, a continuous probability distribution. Dcrit regulates the size of the envelope surrounding the data points of the training set.

Figure 3A:
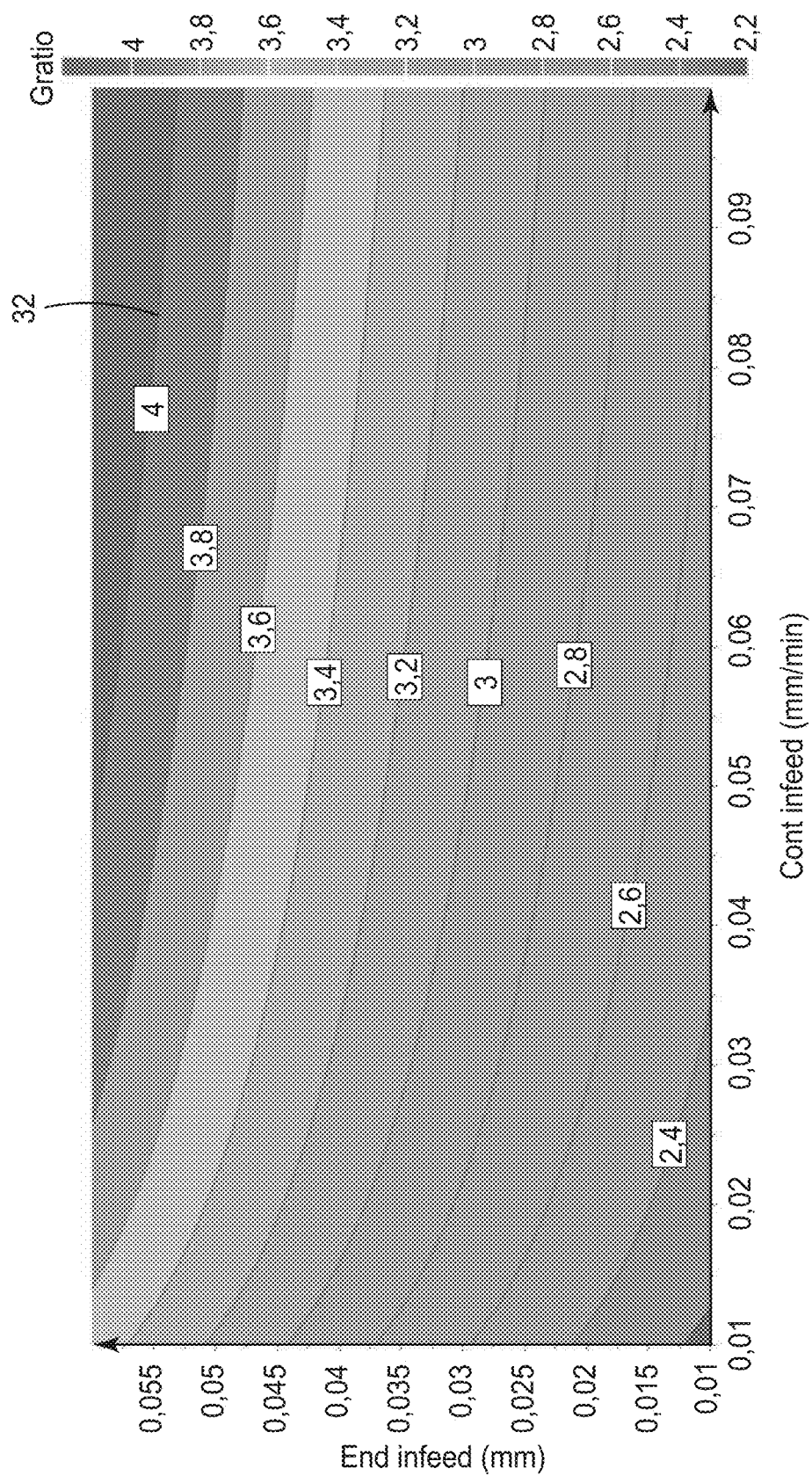
FIG. 3A is a plot illustrating continuous infeed versus end infeed for a grinding wheel L8 where the labeled area represents a G-ratio of 4.0 where the X-axis is a continuous infeed and the Y-axis is an end infeed.
Figure 3B:
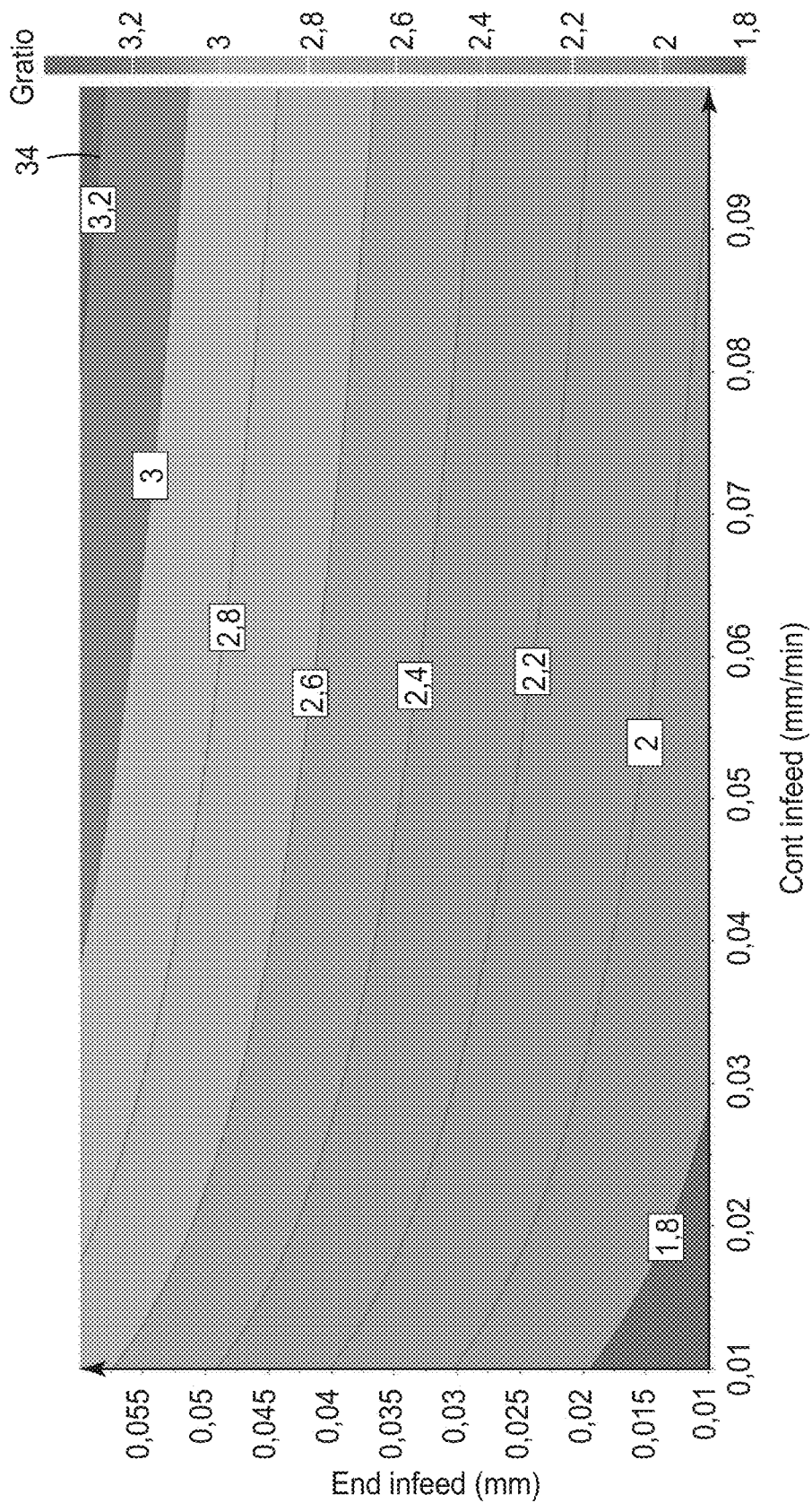
FIG. 3B is a plot illustrating continuous infeed versus end infeed for a grinding wheel M10 where the labeled area represents a G-ratio of 3.2 where the X-axis is a continuous infeed and the Y-axis is an end infeed.

Also, based on the user supplied data, performance may be simulated and the test wheel specification (i.e., hardness, structure and percent 3M™ Precision Shaped Grain (PSG), G-ratio) may be defined. For example, FIG. 3A is a plot illustrating a grinding wheel L8 where the area 32 represents a G-ratio of 4.0 where the X-axis is a continuous infeed and the Y-axis is an end infeed, and FIG. 3B is a plot illustrating a grinding wheel M10 where the area 34 represents a G-ratio of 3.2. The output thus provides a defined test wheel specification. It will be appreciated by those skilled in the art that the G-ratio target is ideally as high as possible for maximum performance.

Once the grinding wheel parameters have been selected, a user reference run with the test grinding wheel may be run. The generated data is saved to a temporary test space and to the global database in the cloud data storage 22 by selecting "save data point" and entering the X (input) and Y (result) parameters. Data points may be saved for a number of competitor grinding wheels to generate a global database by selecting "save data point" and manually entering the X and Y parameters. In sample embodiments, variables are selected that may be changed in the optimization (i.e., wheel speed, roll speed, traverse speed, continuous and end infeed). Results variables to be optimized (i.e., G-ratio and removal rate of grinding wheel) are also selected. The selected variables are then provided to the machine learning tool 24 to generate performance predictions. In a sample embodiment, the machine learning tool 24 automatically generates a face centered cubic (FCC) Design of Experiments (DoE) (where instead of just in the corners and middle there are also experiments in the middle of the faces), makes predictions, and presents the three best next trials based on the results and probabilities of improved results using the parameter values in the results. One test is then selected, and the test is re-run. The saved data points during the re-run are saved and transferred to a "value calculation template," and the results of the value calculation are reviewed, edited, and submitted as a test report to the user.

Usually DoE is used to minimize the number of experiments and maximize the information output in order to minimize work effort. Under ideal conditions, it is possible to understand contributions from 256 variables from 16 trials. In sample embodiments, the trials are not performed but simulations are run to calculate results in the different "experimental points." DoE is used to maximize efficiency in search of the optimum point in an n-dimensional process window. The more points and the better the design, the higher the accuracy. In sample embodiments, a 3-level full factorial was used, although other experimental designs may be used. In an even more extensive design, more data points than the 3-level full factorial may be used where experiments are also added on the middle of all edges.

By collecting grinding data in this fashion, statistical tools such as multivariate analysis and a partial least squares (PLS)/orthogonal projections to latent structures (OPLS) analysis may be used by the machine learning tool 24 to extract information from historic grinding data (or Design of Experiment (DoE)-test grindings) to create models describing variable contributions to performance with good predictive ability. For example, in the case of roll grinding, 63 variables were available in the primary data and 19 of these variables carried information that contributed to prediction of performance, in this case, the grinding ratio of the grinding wheel (G-ratio=grinding ratio, defined as volume of material removed per volume of wheel wear. G thus increases with less wheel wear and/or higher material removal). Data from the 98 grinding results from the 3M™ Cubitron™ II Resin-bond Roll Grinding Wheel mentioned above were in the data set. 83 of these points qualified for use in creation of the data model. The key elements in the multivariate analysis are the ability to extract/separate information and noise and the handling of qualitative variables.

To optimize machine parameters of the roll grinding machine, 14 variables were selected to describe the machine, roll or workpiece and the grinding wheel. 5 variables were selected to describe the machine settings. By using a 3 level-full factorial DoE on the selected 5 machine parameters, a design window was defined. The model was then used to predict performance for the 243 resulting machine setting alternatives. The highest 10-20 were then presented to the user to select the setting to use.

By storing the selected settings and including a step where the user (e.g., application engineer) reports back the actual result, new data is generated that may then be used to improve the underlying model and the prediction. In this manner, the machine learning tool 24 continuously improves its data and its predictive capability.

In conventional manual and physical optimization, it is a very common strategy to change one parameter at a time and sometimes to iterate to identify the next settings to be evaluated. However, when changing one parameter at a time, there is a risk that local limitations may force the user to stop earlier than if multiple parameters were changed simultaneously. By contrast, the approach described herein has the advantage that the model utilizes all the information existing in the historic data and allows or even encourages changes of multiple parameters simultaneously to point to the optimum set of parameters. In this way, the probability of finding a point of operation that has higher performance than iterative changes is significantly higher.

Five tests have been made with a data model based on the 3M™ Cubitron™ II Resin-bond Roll Grinding Wheel data. At machine number 1, improvement was not possible since the grinding wheel was too soft. Machine number 2 had been an optimization object for 5 years with no progress. Use of the machine learning tool provided a 20% improvement in G-ratio when three parameters were changed simultaneously. Machine numbers 3, 4, and 5 all exhibited a +30% improvement in G-ratio together with improved cycle time.

The advantage of using the machine learning tool 24 for simulation and optimization applications as described herein is that it may predict improved product usage and pricing based on historic business operations and then make consequent predictions of non-existing materials/variants. In many cases, industrial products such as bonded abrasive products are classified according to different safety standards such as burst speed. Burst tests have been useful to provide data to then predict burst speed of bonded abrasives with successful outcomes. This has the potential to reduce the need for destructive testing and automating the assignment of maximum operating speed to the bonded abrasive products. Burst tests are conventionally performed using automated burst test equipment, and wheel selection for burst testing follows the regional standards, such as ANSI, EN, and JIS. To automate such a process, an understanding of the different product groups and how they relate to each other must be understood based on differences in characteristics. For example, in bonded abrasives, such characteristics may include abrasive groups and specifications. A very simple example of product map may include data such as the existing product name, dimensions, accessories, system components, force, speed, and grinding process used.

Figure 4A:
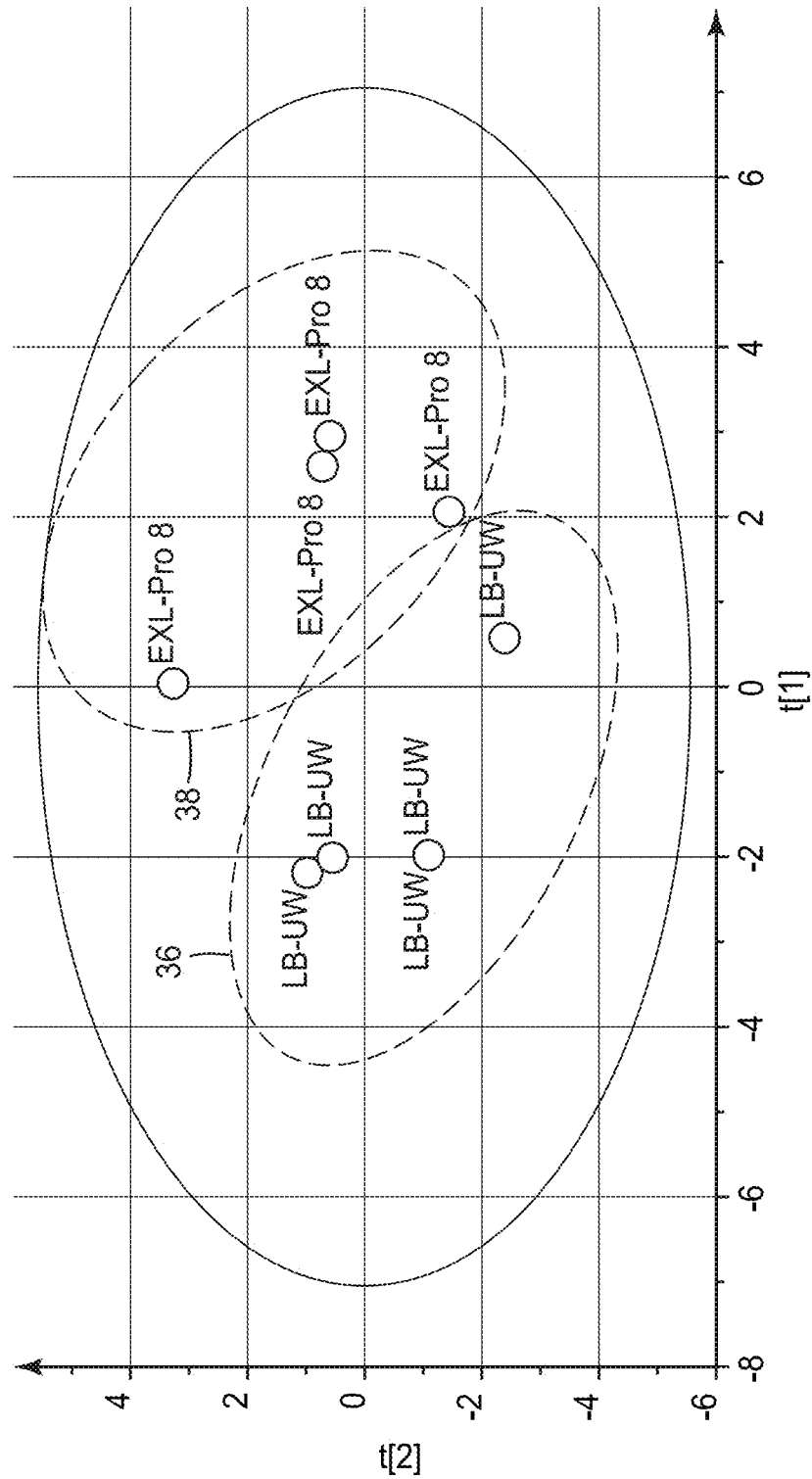
FIG. 4A is a plot illustrating how the two products LB-UW and EXL-Pro 8 differ in characteristics by the shape of the two groups of product characteristics.
Figure 4B:
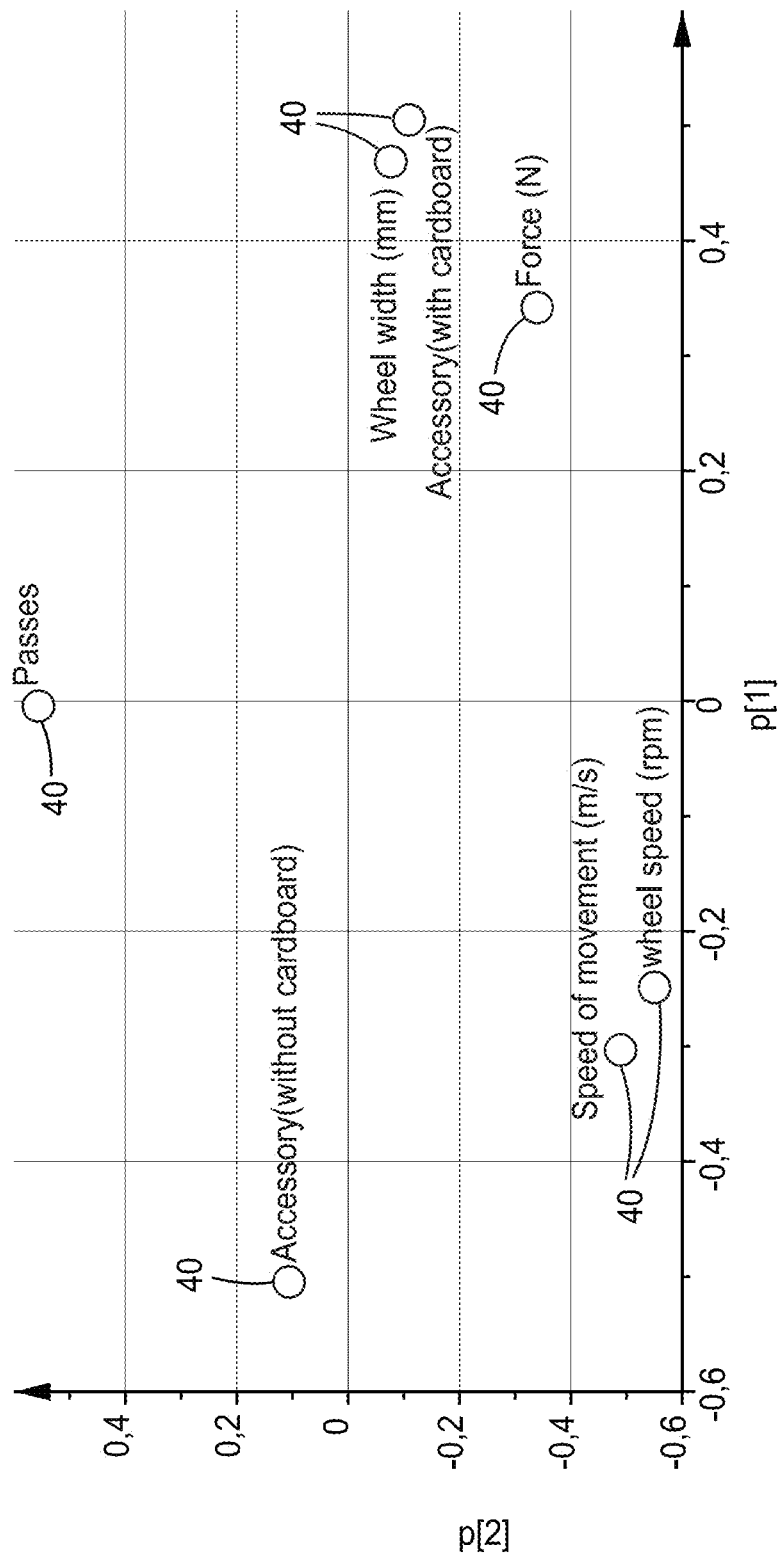
FIG. 4B is a plot illustrating a view of the variables of the products illustrated in FIG. 4A.

The resulting data may be graphed to illustrate how products differ from each other in characteristics. For example, FIG. 4A is a plot illustrating the analysis of how the two-wheel grinding products LB-UW and EXL-Pro 8 differ in characteristic by the shape of the two groups (LB-UW is shown at 36 and EXL-Pro 8 is shown at 38). FIG. 4B is a plot illustrating a view of the variables 40 of the products illustrated in FIG. 4A. If the plots of FIG. 4A and FIG. 4B are considered together, it becomes apparent that variable wheel speed and speed of movement is higher while variable force is lower for the LB-UW products. This data was found to correlate to a longer life expectance for the LB-UW product compared to the EXL-Pro 8 product. FIG. 4A and FIG. 4B together also illustrate that a constructive discussion on different product characteristics is much facilitated by utilizing the type of analysis described herein.

As another example, when a high number of products are used in the same applications but on different materials or with different machine settings, the analysis described herein may be used to enable visualization to see where there are overlapping products or gaps to fill. When launching a new product and utilizing the machine learning predictive tools described herein, it will very rapidly be possible to describe which products may be replaced in the existing portfolio and which characteristics are truly unique for the new product. In the case of roll grinding application engineer tool data, the data may also be used to analyze and understand the customer base. For example, a score plot may be used to show customers their "patterns" in their machine settings and the performance results achieved. Looking at the data from a variables perspective may be used to isolate the G-ratio as well as hard to grind or easy to grind materials. Also, a new product may get to market faster if the product may be tested with selected customers in the scores swarm and in a structured way define in what group that product would provide the largest benefits. As the knowledgebase grows and models improve, the machine learning tool 24 may be used to more accurately provide correct specifications for customer needs and to provide correct and relevant machine settings. Over time, the knowledgebase so developed will become key to development and improvement of the industrial tools.

The statistical approach described herein creates general data models from data, and variables, that contribute to predictive ability. As noted in the above example, the statistical model approach may be used to predict grinding performance. An advantage with this approach is the statistical analysis of values and model ability (i.e., model confidence, error source for outliers, identify new objects with different characteristics, the efficient visualization of data, etc.) is automatically included. However, it will be appreciated by those skilled in the art from the above example and the following description of FIG. 5 that corresponding data models may be generated from other types of industrial processes using the techniques described herein.

Predictive Model

Figure 4E:
Figure 5:
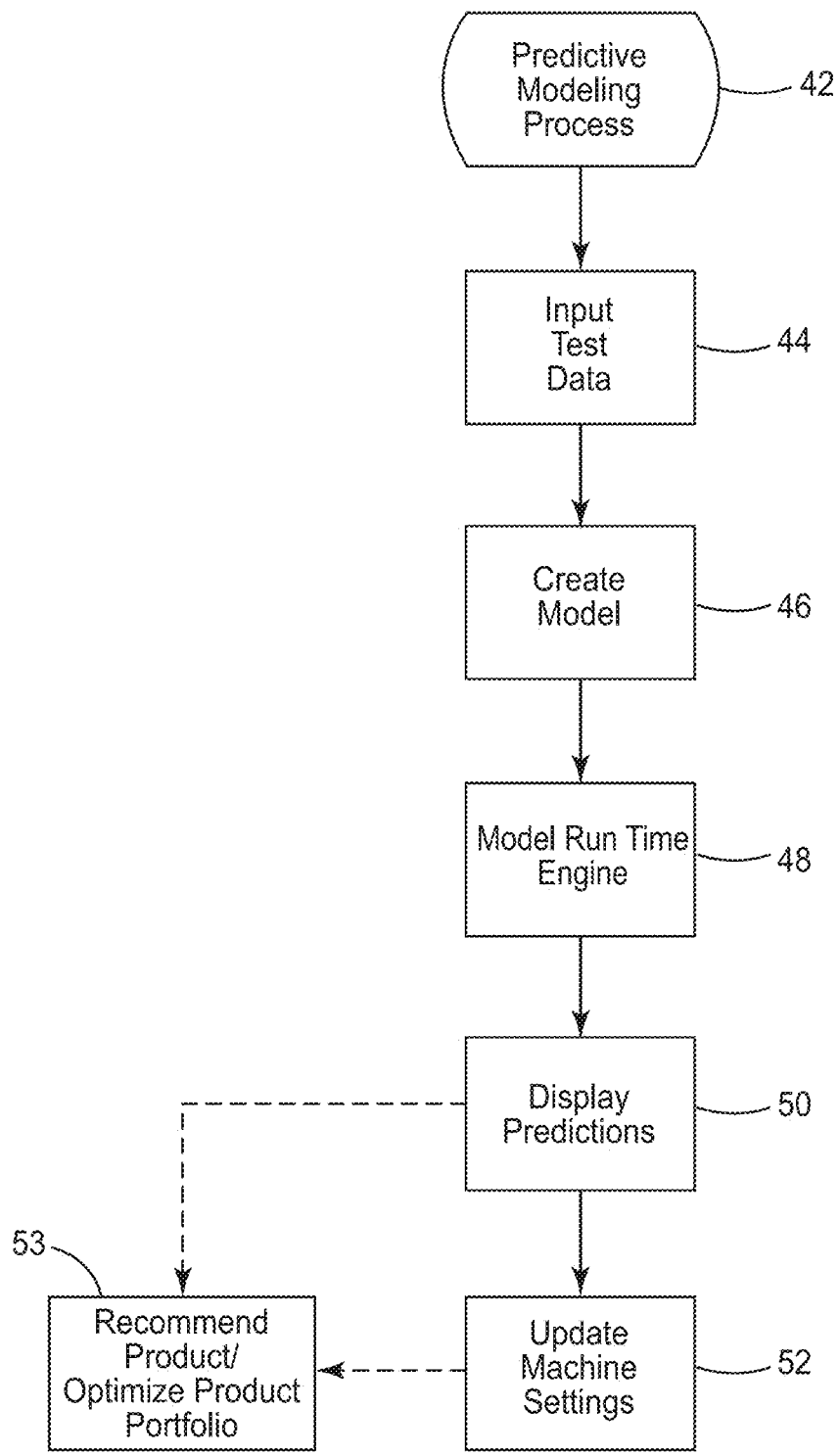
FIG. 5 is a flow chart illustrating the predictive modeling process in sample embodiments.

FIG. 5 illustrates a generalized predictive modeling process 42 in a sample embodiment. As illustrated, the predictive modeling process 42 starts by inputting test data into a spreadsheet such as Xcel at 44. Such test data depends on the industrial application. For example, in grinding applications, the test data may include machine type, machine age, machine power, and grinding parameters such infeed, wheel speed, roll speed, etc. as illustrated in FIGS. 4C-4E. The more test data that is provided, the more accurate the resulting prediction may be expected to be. Any data of a confidential nature would only be evaluated internally if necessary for use in the model. In sample embodiments, up to 30 Design of Experiments (DoE) tests may be used to generate the test data. As known to those in the field of statistics, DoE is a method to change variables in a structured way to quantify variable contributions to responses and by designing/selecting the experiments carefully so that variable interactions, exponential and non-linear relations may be quantified and utilized to produce a model with predictive ability, usually with a minimum number of experiments. A DoE tests involves not only the selection of suitable independent, dependent, and control variables, but planning of the delivery of the experiment under statistically optimal conditions given the constraints of available resources. In sample embodiments, such experimental set-ups are provided to enable the generation of suitable input variables and output variables for generation of a data model of the operation of the industrial process of interest. Typically, the input variables include process variables and the output variables including result variables from the operation of the industrial process, and the resulting data model represents contributions to changes in the output or result variables by the respective input or process variables in accordance with the experimental arrangement.

A data model is created at 46 from the collected statistical test data using the statistical techniques described in more detail below. The data model is then provided to model development software and model runtime engine, such as the SIMCA Q.DLL math engine at 48. The model development software and model runtime engine include a predictive algorithm that generates the predictions for the specified input variables expected to have the most significant impact on the output variables affecting performance of the grinding application. In operation, the model development software and model runtime engine 48 performs a pre-treatment process for the centering and scaling of variables including the Y-space scores vector(s) and the X-space scores vector(s). Through calculation of the transfer vector between X-space vectors and Y-space vectors, the predictive model is defined. The post-treatment process (i.e., reverse centering and scaling of variables) includes running sample data or the DoE data through the model and presenting the variables and results. The predictive algorithm is then a function of the model, the DoE, and the tests surrounding it, Q2, R2, Scores, Loadings, Hotellings, and DmodX, where the tests provide metrics on data structure and model capability.

A graphics interface is generated, and the prediction results are provided graphically in a web interface at 50. In sample embodiments, the web interface display includes several variable/machine parameters and output performance values such as G-ratio or surface finish that are adapted for presentation in a graphics display (in a WINDOWS™ or other application interface format) such as the graphics display 26 or the display in a software application of a user's smartphone 28 (FIG. 1).

Figure 6:
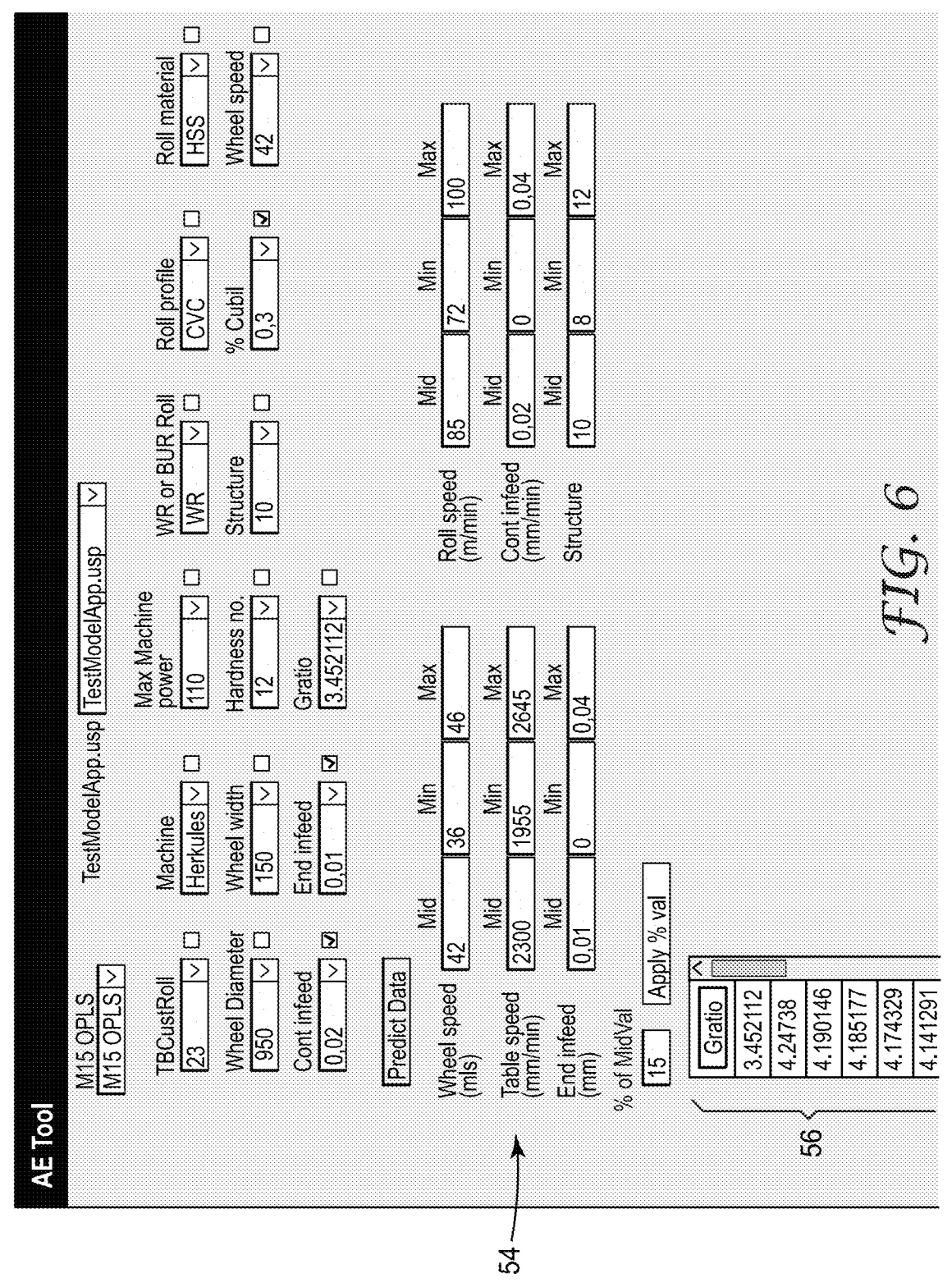

A sample output display is illustrated in FIG. 6 showing the values for the predicted parameters 54 for the machine settings of interest and the best possible performance values 56 (e.g., G-ratio) for the machine settings in the particular industrial application. The user then uses these values to manually update the machine settings and to provide the machine settings as the input or process variables to the industrial process to optimize selected output variables at 52. In the illustrated example of a grinding wheel application, such machine settings may include G-ratio, material removal rate of a grinding wheel, chip thickness, pieces per dressing cycle, surface finish, speed of grinding wheel, speed of roll, traverse speed of grinding wheel in relation to roll, continuous infeed, end infeed, grinding time, feed rate, shifting, dressing, dressing infeed, infeed, and overlap ratio and the like. Alternatively, the adjustments may be automatic whereby the variables/machine parameters are provided directly to the ancillary controller 20 or main controller 16 in the embodiment of FIG. 1 to automatically control the operation of the servo motor 14. The updated machine settings may then be fed back to update the predictive model at 48. Alternatively, as will be explained below with respect to other embodiments, the predictions optionally may be used to provide product recommendations and/or to optimize product portfolios by identifying holes and/or overlaps in product lines at 53.

Thus, the predictive model of FIG. 5 may be used to process inputs and outputs relating to an industrial process, create a data model for the data, generate predictions from the data model, and provide predictions of best possible results (e.g., best machine settings) based on test data. Users may change multiple parameters (e.g., wheel specification, speed, etc.) at the same time and make adjustments until a desired output has been developed (e.g., best possible G-ratio while eliminating redundant iterations that do not lead to performance improvements). In the above roll grinding example, generic test data is collected (e.g., into spreadsheet) and data is collected relating to the roll (e.g., roll diameter, roll width), the wheel (e.g., wheel diameter, wheel width, abrasive grit hardness, hardness number, structure, bond, etc.), and the grinding machine parameters (e.g., wheel speed, roll speed, table speed, continuous infeed, end infeed, number of passes rough, chip thickness, special material removal rate, speed ratio wheel/roll, overlap ratio, used machine power, machine pressure, machine current, etc.) and the test results (e.g., G-ratio, surface roughness, grinding time). The data model is created from the statistical data using multivariate analysis and processed using a math engine, and the data model is used to generate predictions and graphics for display in a web-based application. The prediction results are displayed on a display (FIG. 6). Simultaneous changes of multiple variables and machine parameters are permitted to accelerate prediction of the best possible results and recommended machine settings based on the test data. New models may be loaded to address new applications as well as new industrial processes. Further examples are provided below.

Data Model Creation

The creation of the predictive model at 46 in FIG. 5 may use any of a number of methods known to those with a background in statistical analysis and/or linear algebra. For example, the model creator starts by clarifying the test objective and reviewing the dataset. In the roll grinding example above, 98 rows of grinding test data from 29 different tests occasions were used. The variables to support the objective are then grouped and an initial principal component analysis is run on the data. The resulting Scores, Loadings, DModX, Hotellings, and residuals (described below) are reviewed. The variables are also reviewed to identify information and patterns that are not described in the dataset. New variables are generated as appropriate. A principal component analysis is run on the updated dataset. Any changes that improve the model fit, R2, are kept. R2 is the percent of variation of the training set—Y with orthogonal projections to latent structures (OPLS)—explained by the Y-predictive components. R2 is a measure of fit, i.e., how well the model fits the data. A large R2 (close to 1) indicates a good model but it is not sufficient, for a poor predictive model may still have a large R2. A poor R2 is also obtained when one has poor reproducibility (much noise) in the training set, or when for other reasons X does not explain Y.

Output or result (Y-variables) are introduced as appropriate, and the model is run according to instructions, often algorithm for a partial least squares (PLS) or OPLS analysis is used to produce the models. The resulting Scores, Loadings, DModX, Hotellings and residuals are again reviewed and observed versus a predicted plot. A variable importance plot is generated and reviewed. Expanded cross/square variables are added as well as a transformation of variables as recommended while stepwise generating new models and keeping changes that improve the model fit R2 and/or predictive ability Q2 of the dataset. Q2 is the percent of variation of the training set—Y with OPLS—predicted by the model according to cross-validation. Q2 indicates how well the model predicts new data. A large Q2 (Q2>0.5) indicates good predictivity. A poor Q2 is obtained when the data has much noise, or when the relationship X to Y is poor, or when the model is dominated by a few scattered outliers. In the process described herein, outliers (observations) in the data are typically removed and variables not uniquely contributing to improved predictive ability are removed by an iterative process to generate the model. The variable plots are again reviewed to confirm the contributions of the variables. The process is stopped when improvements in R2 and Q2 give sufficiently minor changes, for example, in hundredths or thousands of a percentage point.

Those skilled in the art will appreciate that PLS regression is a statistical method that bears some relation to principal components regression. However, instead of finding hyperplanes of maximum variance between the response and independent variables, it finds a linear regression model by projecting the predicted variables and the observable variables to a new space. Because both the X and Y data are projected to new spaces, the PLS family of methods are known as bilinear factor models.

PLS is used to find the fundamental relations between two matrices (X and Y), i.e. a latent variable approach to modeling the covariance structures in these two spaces. The PLS model tries to find the multidimensional direction in the X space that explains the maximum multidimensional variance direction in the Y space. PLS regression is particularly suited when the matrix of predictors has more variables than observations, and when there is multicollinearity among X values.

More information about a sample prediction process that may be incorporated herein may be found in a book entitled "Multi and Megavariate Data Analysis," 3rd revised edition, L. Eriksson, T Byrne, E Johansson, J Trygg, C Wikström and thus will not be further described herein.

Predictions and Optimizations

Once R2 and Q2 have been calculated, the work file is saved. All work models are removed and only the last data model is saved as a model description file. The resulting data model may be used to make predictions and/or simulations of the system from which the data originates, in this case, a grinding model. For example, once the data model has been created at 46, the model description file containing the data model for the application is then called by the model development software and model runtime engine at 48. In a sample embodiment, code automatically sends the test/ machine settings to the model development software and model runtime engine, which makes predictions by running the data model through its predictive algorithm as described above.

Optimization is then performed by defining variables to optimize, typically the machine variables. Ranges are defined for each variable. High/low settings are used where the process is known to be stable and the operator of the machine being optimized is comfortable. In the example noted above, a DoE matrix was generated, a 3-level full factorial (3 levels and 5 variables give $3^5$ (243) different combinations), and the DoE matrix was run through a simulation model. Variable combinations were sorted based on performance/value/result in the response variables as appropriate. Preferred variable settings were selected and a run was made to confirm results.

The machine learning tool 24 also implements a "self-learning process" that provides continuous optimization. By saving the actual results after the optimization to the initial model/calibration/datafile, a new model may be produced which includes learning and information from trials that have just been performed. If the new data points improve model fit and/or predictive ability, they may be added, and a new model generated. Initially this step is manual, but since variable contributions and transformations are likely not to change, this step may be automated and greatly simplified compared to the process described above. If the model fit and/or predictive ability decrease, review of the variable contributions needs to be conducted to identify new variables/interactions/transformations to determine if the observation is an outlier or an observation containing new information.

Simulations

Once a data model has been created, simulations of different operating conditions of the industrial process may be generated to show the predicted results for specified input machine parameters without actually having to run the industrial process. The simulation results so generated may be displayed on display 26 or sent to the operator's smartphone 28 for display (see FIG. 1).

Statistical Analysis

The test data to generate the data model and to predict outcomes based on changes to different variables is generated using statistical analysis. Short definitions of the terminology useful in understanding the statistical analysis applied in sample embodiments is described below.

Partial Least Squares Projections to Latent Structures

Partial Least Squares (PLS) is used to relate the result variables to the input and process variables in sample embodiments to address the problem of identifying those input and process variables (X) that are "responsible" for changes in the output or result variables (Y). For this purpose, multiple regression may be used. However, multiple regression leads to great difficulties because process data usually does not possess the correct properties for regression modeling as regression deals with each result variable ($y_m$) separately. Therefore, one ends up with a set of models, one for each output of interest. This makes interpretation and optimization difficult or impossible. To allow a strict interpretation of cause and effect, the data is collected in a careful experimentation process using statistical DoE design, using software such as MODDE®. To search for relationships between input and output in process logs is risky and often less successful because a process does not provide data with good information content when the important factors are well controlled within small control intervals.

Partial Least Squares—Scores

PLS modeling has been developed for situations with numerous, often-correlated input and process variables with several to many result variables. To use PLS, one specifies which variables in the database are predictors (X) and which variables are dependent (Y). PLS then finds the relation between the variables X and Y. The PLS model is expressed as a set of X-score vectors, Y-score vectors, X-weight vectors, and Y-weight vectors for a set of PLS model dimensions. Each dimension (index a) expresses a linear relation between an x-score vector ($t_a$) and a Y-score vector ($u_a$). The weight vectors of each model dimension express how the X-variables are combined to form $t_a$ and how the Y-variables are combined to form $u_a$. In this way, the data are modeled as a set of factors in X and Y and their relationships. Plots of the scores and weights facilitate interpretation of the model.

Partial Least Squares—Loadings

The PLS analysis results in model coefficients for the variables, called PLS-weights or loadings. The loadings for the X-variables, denoted w, indicate the importance of these variables, i.e., how much they in a relative sense participate in the modeling of Y. The loadings for the Y-variables, denoted by c, indicate which Y-variables are modeled in the respective PLS model dimensions. When these coefficients are plotted in a w*c plot, a picture is obtained that shows the relationships between X and Y, those X-variables that are important and those Y-variables that are related to which X-variable, etc.

Partial Least Squares—Residuals

PLS provides residuals on both the results (Y-side) and on the input (X-side). The standard deviation of these residual distances may be plotted just as for principal components analysis to provide a third statistical process control plot showing if the process is behaving normally or not in the DModX and DModY plots.

Principal Component Analysis

Principal Component Analysis (PCA) of a data table gives vectors of scores, with values $T_{ia}$, which summarize all the variables entering the analysis. It is customary to calculate two or three score vectors and then to plot them against each other to generate tt-plots. The tt-plots give a picture that is the best summary of the process behavior over time. The tt-plots allow one to see trends, unusual behavior, and other things of interest. The number of components is decided by the component contribution to the model's predictive ability or to individual component contributions to an individual results variable. When contributions are lower than a threshold, then generation of components is stopped. With experience, it is possible to recognize an area in the PCA score plot in which the process remains under "normal" operation to provide a multivariate control chart. The score plot in combination with the loading plot together indicate the responsible values for deviations from normal operation.

Figure 7A:
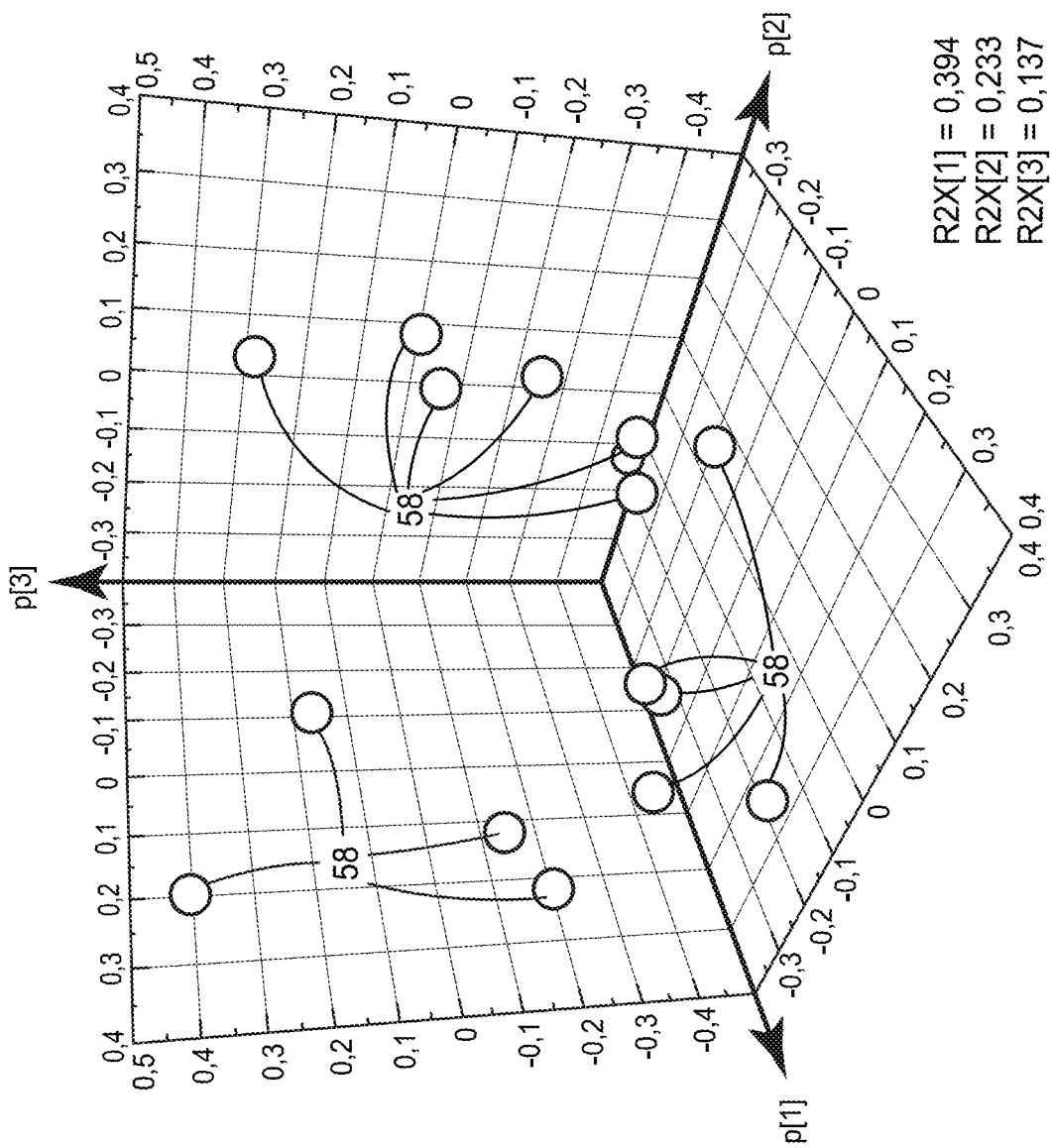
FIG. 7A is a plot illustrating PCA analysis of product properties of adhesives and tapes.
Figure 7B:
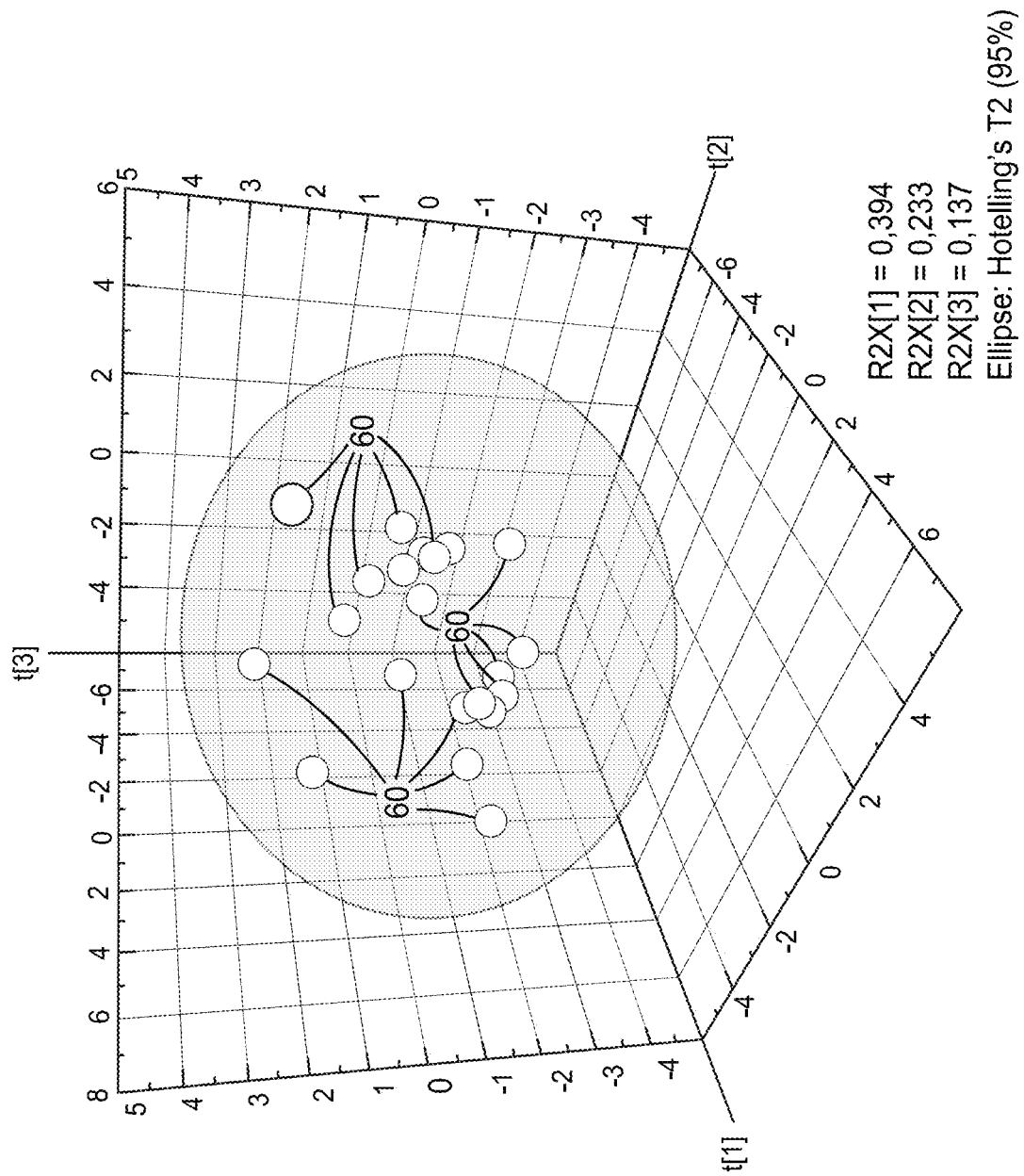
FIG. 7B is a score plot illustrating the relations between the different rows or products.

For example, FIG. 7A and FIG. 7B are loadings plots illustrating PCA analysis of product properties (e.g., modulus of elasticity, tensile strength, viscosity, toughened, polyacrylic, abraded, elongation at break, FRP, PVC, open time, etc.) 58 of adhesives and tapes (FIG. 7A) where the scores plot of FIG. 7B illustrates the relations between the different rows or products (e.g., DP100 Clear, DP100FR White, DP190 Gray, DP270 Black, DP105 Clear, DP 100 Plus Clear, DP110 Gray, DP405 Black, DP100FR White, etc.) 60. Each product is positioned according to its unique combination of properties. The loadings plots of FIG. 7A and FIG. 7B show how the properties/columns relate to each other and provide the basis for a product selector or a translation table. The PCA also provides residuals, deviations between the data and the PCA model, named DModX. When these residuals are large, this indicates an abnormal behavior in the process. To see this, a plot of the residual standard deviation, DModX (residual distance, root mean square) is provided. The DModX plot may be used to identify data outliers. This indicates that these observations are different from then normal observations with respect to the correlation structure of the variables.

In the case of principal components analysis, it will be appreciated that variables with the same correlation pattern are grouped. The group of variables with the highest correlation to the results parameters (price or performance) become the 1st principal component and the second highest correlated group becomes the 2nd principal component. Principal components are added until criteria for contributions to predictive ability or model fit are no longer met. On the other hand, in the case of application mapping or product selector applications, there is no results parameter. The variables, characteristics, uses, and applications are plotted as principal components and the products and applications are plotted in positions corresponding to the mix of variables and characteristics that make up the specific observation. These and other variations will become apparent to those skilled in the art of statistical analysis.

Orthogonal Projections to Latent Structures (OPLS)

OPLS is an extension of PLS and addresses the regression problem. OPLS separates the systematic variation in X into two parts, one part that is correlated (predictive) to Y and one part that is uncorrelated (orthogonal) to Y. This gives improved model interpretability. In the single-Y case, there is only one predictive component, and all components beyond the first one reflect orthogonal variation. However, with multiple Y-variables, there may be more than one predictive OPLS component.

Two-way Orthogonal PLS (O2PLS) is another extension of PLS that addresses the data integration problem. In the two-block (X/Y) context, O2PLS examines which information overlaps between the two data tables and which information is unique to a specific data table (X or Y). O2PLS accomplishes this task by a flexible model structure incorporating three types of components, that is:
 (i) Components expressing the joint X/Y information overlap;
 (ii) Components expressing what is unique to X; and
 (iii) Components expressing what is unique to Y.

For both OPLS and O2PLS, the different components are interpretable the usual way, since the scores, loadings, and residual-based parameters with a familiar meaning are preserved.

Scores Scatter Plot t1 Versus t2

Figure 8:
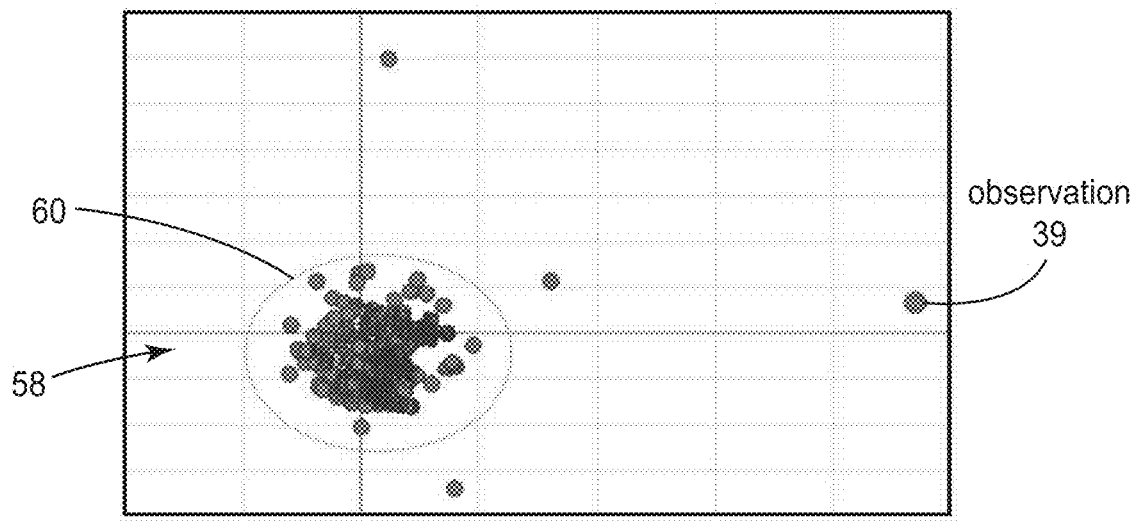
FIG. 8 is a score plot illustrating the possible presence of outliers, groups, similarities, and other patterns in the data.

The scores t1, t2, etc. are new variables summarizing the X-variables. The scores are orthogonal, i.e., completely independent of each other. There are as many score vectors as there are components in the model. The score t1 (first component) explains the larges variation in the X space, followed by t2, etc. Thus, the scatter plot of t1 versus t2 is a window in the X space displaying how the X observations are situated with respect to each other. The score plot in FIG. 8 shows the possible presence of outliers, groups, similarities, and other patterns in the data. The score plot 58 is a map of the observations. With a two-dimensional score plot 58, the model development software and model runtime engine draws the tolerance ellipse 60 based on Hotelling's T2. Observations situated far outside the ellipse are outliers as, for example, observation 39 (the rightmost dot) in FIG. 8.

Observations with a DModX twice as large as the critical value of DModX (Dcrit) are moderate outliers. This indicates that these observations are different from the normal observations with respect to the correlation structure of the variables. A moderate outlier may be interpreted by selecting it and opening up a corresponding contribution plot that displays the residuals of all X-variables. Variables with large positive or negative residuals are those differing with respect to the systematic structure captured by the model.

Hotelling's T2 Plot

The Hotelling's T2 (column or line) plot displays the distance from the origin in the model plane (score space) for each selected observation. The plot shows the T2 calculated for the range of selected components, i.e., 1 to 7, or 3 to 6. Values larger than the 95% confidence limit are suspect, and values larger than the 99% confidence limit may be considered as serious. A large T2 range value for a given observation, i.e., a value far above the critical limits, indicates that the observation is far from the other observations in the selected range of components in the score space. Hence, it is likely to be an outlying observation that, if in the training set, may pull the model in a detrimental way. T2 is basically calculated as the sum over the selected range of components of the scores in square divided by their standard deviations in square. Thus, T2 is the distance in the model plane (score space) from the origin, in the specified range of components.

When one or several training set observations with large T2 range values are seen, the operator may look also at the scores, DModX, and contribution plots of the same model and the same range of components to help understand why the observations have high T2 range values. It is noted that a set of points marked in the T2 plot will also be marked in the score and DModX plots.

Loadings Scatter Plot pq1 Versus pq2 OPLS/O2PLS

Figure 9:
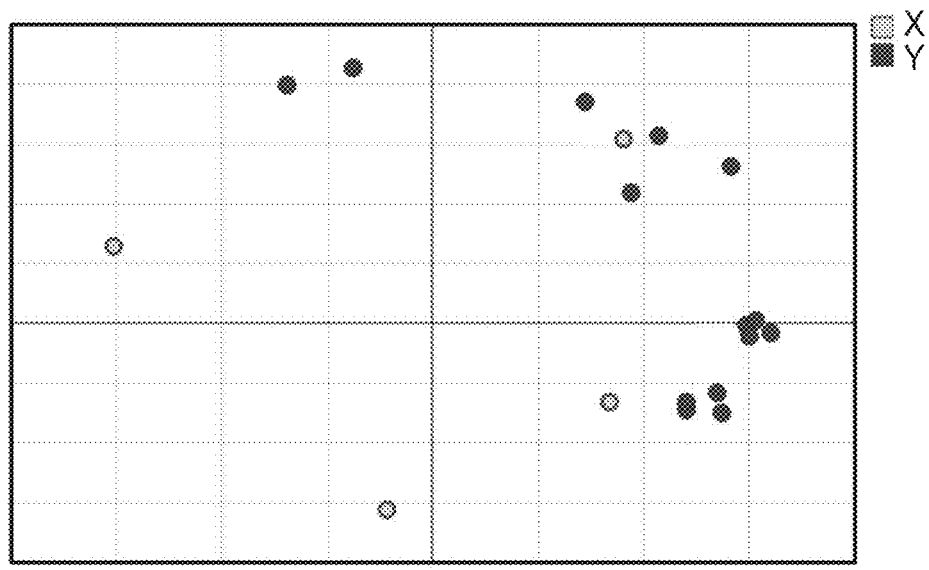
FIG. 9 is a pq plot that is a superimposition of the p plot and the q plot for the first and second predictive components of the orthogonal projections to latent structures (OPLS)/ Two-way Orthogonal PLS (O2PLS) model.

The OPLS/O2PLS loadings plot displays the relationship between the X-variables and the Y-variables for the predictive components. The loadings p correspond to the X-part of the model and the loadings q correspond to the Y-part of the model. To facilitate interpretation, this plot is color coded according to the model terms for X and Y. The pq plot of FIG. 9 is a superimposition of the p plot and the q plot first and second predictive components of the OPLS/O2PLS model. The loadings p correspond to the covariances between the X-variables and the predictive score vectors t, whereas the loadings q correspond to the covariances between the Y-variables and the predictive score vectors u. X and Y variables with large p or q contribute strongly to the model. It is thus possible to see how the Y-variables vary in relation to each other, which ones provide similar information, and their relationship to the X-variables in the model.

Normal Probability Plot of Residuals

Figure 10:
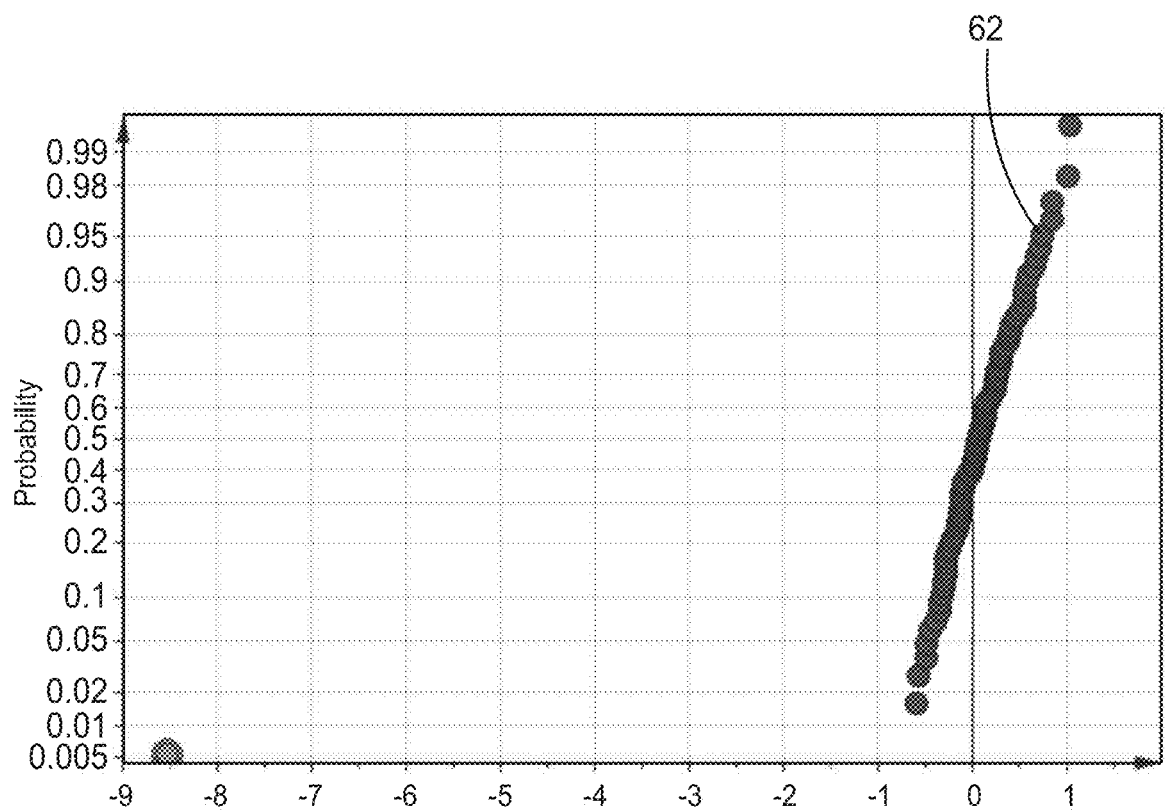
FIG. 10 is the Normal Probability Plot of Residuals where the residuals are standardized on a double log scale.

As illustrated in FIG. 10, the Normal Probability Plot of Residuals displays the residuals standardized on a double log scale. The standardized residual is the raw residual divided by the residual standard deviation (RSD). The plot of FIG. 10 enables one to detect outliers and to assess the normality of the residuals. If the residuals are random and normally distributed, the normal probability plot of the residuals has all the points lying on a straight line 62 between −4 and +4 standardized standard deviations. Experimental runs lying outside the −4 or +4 standard deviations are outliers.

As explained further below, the predictive model and associated statistical analysis may be applied to data generated by any of a number of industrial processes to provide product selection tools, product recommender tools for particular applications, and portfolio optimizers for product portfolio rationalization.

Industrial Engineering Application Example—Adhesive Selection Tool

Currently, a large portion of the adhesive products selection process for customer applications is performed based on the experience of the application engineer. The performance of the bond will depend on the interaction between the adhesive and the substrate. The adhesive behavior, whether the adhesive is a pressure sensitive adhesive with or without additional adhesive or non-adhesive layers, is usually well characterized; however, the substrate nature may vary greatly depending on a large number of parameters such as surface finish, bulk polymer additives, surface treatment (corona, primer, etc.), aging, storage condition, and the like. Thus, adhesive selection provides another industrial environment where the predictive modeling tool described herein may process collected data to predict adhesive performance to help accelerate and to improve the adhesive selection process.

Figure 11:
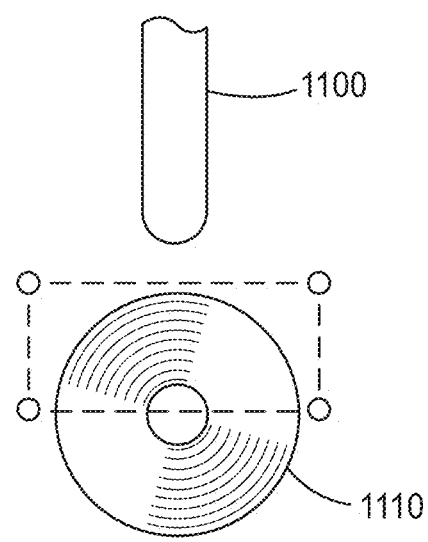
FIG. 11 illustrates a handheld device that measures the surface free energy of a surface of a substrate.

In sample embodiments, handheld instruments may be used for the collection of needed data from the substrate surface. Such data collection may be performed at the customer site or any other convenient location. For example, the surface free energy of a surface is a parameter that dictates the performance of an adhesive/substrate. The surface free energy is calculated using the contact angles of two known liquids and by measuring the contact angle of the droplets on the surface of the substrate. For example, FIG. 11 illustrates a handheld device 1100 that measures the surface free energy of a surface of a substrate 1110. The device of FIG. 11 uses a liquid droplet on a solid surface to measure the contact angle.

Figure 12:
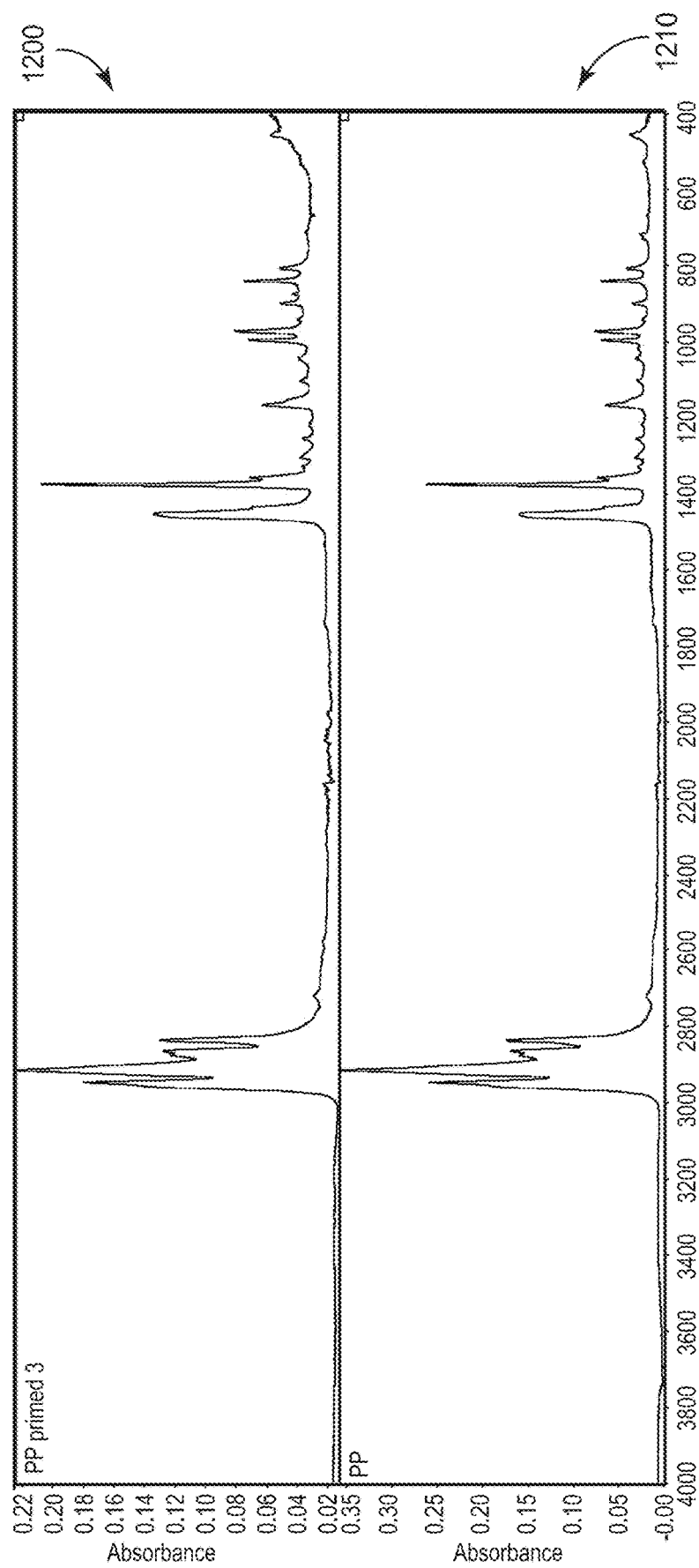
FIG. 12 illustrates the FTIR spectra of two polypropylene samples.

Fourier Transform Infrared (FTIR) spectroscopy also may be used to measure parameters of an adhesive/substrate in sample embodiments as FTIR spectroscopy is ideally suited to determine the identity of a polymeric material. FTIR spectroscopy is a technique used to obtain a far-infrared spectrum of absorption or emission of a solid, liquid or gas by measuring how much light a sample absorbs at each wavelength. An FTIR spectrometer simultaneously collects high-spectral-resolution data over a wide spectral range by pressing a sample against a diamond crystal to collect absorption data. For example, FIG. 12 illustrates the FTIR spectra 1200 and 1210 of two polypropylene samples. In FTIR spectroscopy, a Fourier transform is used to convert the raw data into the actual spectrum of the type illustrated in FIG. 12.

Other measurable input variables for an adhesive/substrate may include one or more of the following: adhesive physical characteristics, adhesive thermal characteristics, adhesive electrical characteristics, adhesive curing characteristics, adhesive performance characteristics, adhesive durability characteristics, adhesive chemical resistance characteristics, adhesive rheological characteristics, adhesive composition, adhesive dispensing characteristics, adhesive use requirements, standardized tests or certifications, environmental parameters, health parameters, safety parameters, carrier characteristics, backing characteristics, linear characteristics, and materials to be bonded by the adhesive.

As in the above grinding example, multivariate analysis also may be used to understand how the different factors influence each other as well as to determine the main causes of variations in a dataset. Also, as in the above grinding example, Partial Least Squares (PLS) may be used to process the data originating from analytical instruments (e.g., FTIR, nuclear magnetic resonance (NMR), etc.) to construct predictive models.

Figure 13:
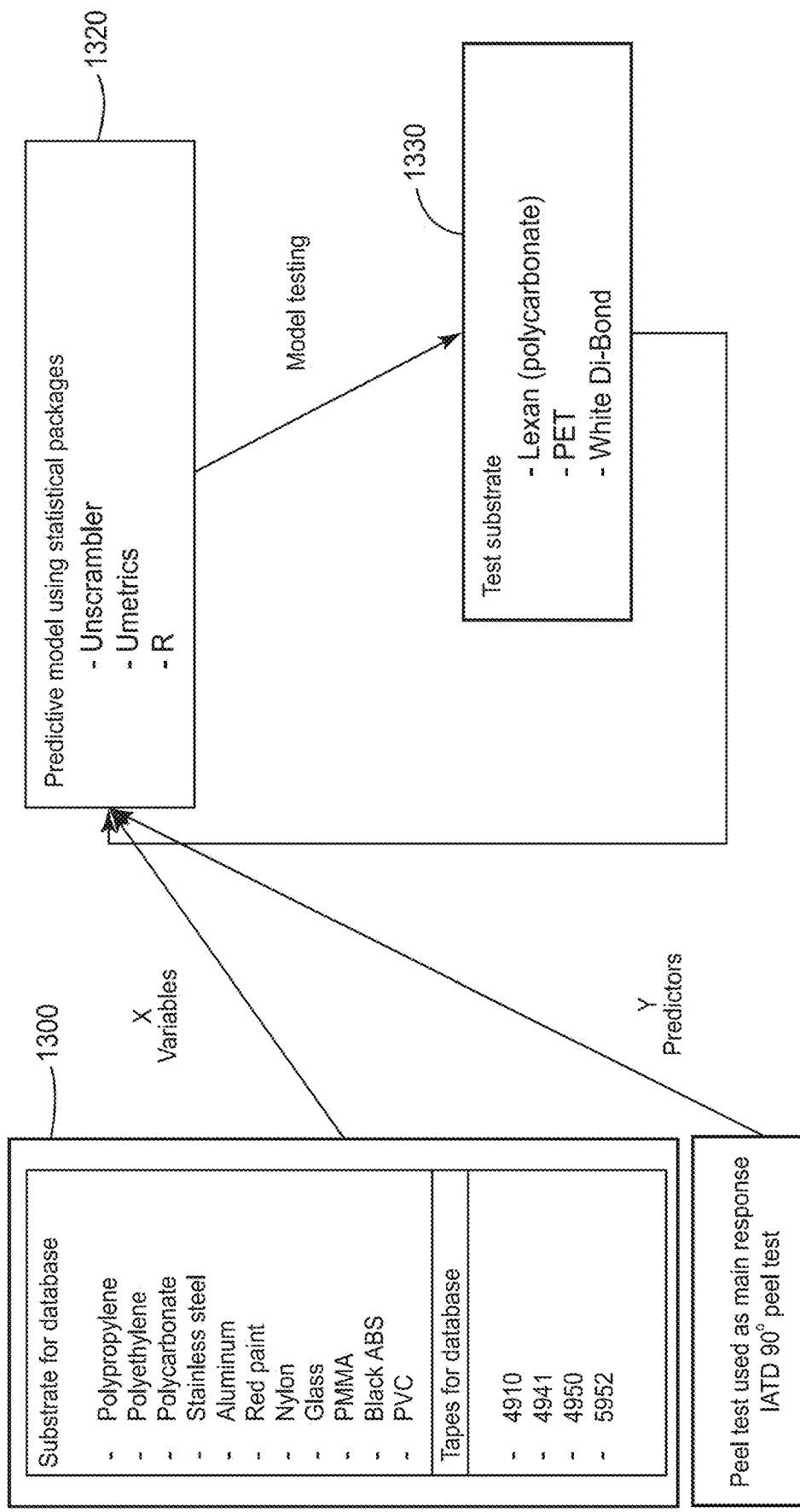
FIG. 13 illustrates the workflow for applying the predictive modeling technique to the adhesive products selection process in sample embodiments.

The workflow for applying the predictive modeling technique described herein to the adhesive products selection process is summarized in FIG. 13. As illustrated, the X-variables representing the substrate parameters are collected using a variety of measurement techniques such as FTIR spectroscopy the create a database 1300 including the parameters for respective substrates such as polypropylene, polyethylene, polycarbonate, stainless steel, aluminum, red paint, nylon, glass, polymethylmethacrylate (PMMA), black acrylonitrile butadiene styrene (ABS), polyvinylchloride (PVC), etc. and for respective adhesive products such as adhesive tapes (e.g., by part number). The Y-variables may be collected, for example, by performing peel tests (e.g., a 3M Industrial Adhesives and Tapes Division (IATD) 90° peel test) at 1310 to establish a main response for the adhesive tape on the respective substrates. This type of analysis may be used to create a predictive model at 1320 using statistical packages such as Unscrambler, Umetrics, and R based on a set of variables that influence measurable output parameters. For example, the performance of the tape/substrate combination evaluated using a standard peel strength test may be used as the main response. The resulting output variables may include name of the recommended adhesive, adhesive structural characteristics, adhesive performance characteristics, quantification of quality of fit, and/or purchasing information. The two surfaces of interest are analyzed using the chosen techniques (surface energy and FTIR spectroscopy) and used as variables in the statistical packages to create the predictive model 1320 as described with respect to FIG. 5. The predictive model 1320 is then tested by testing the substrate at 1330, and the process is iterated using additional samples to improve the predictive model 1320 as an iterative process over time.

Figure 14:
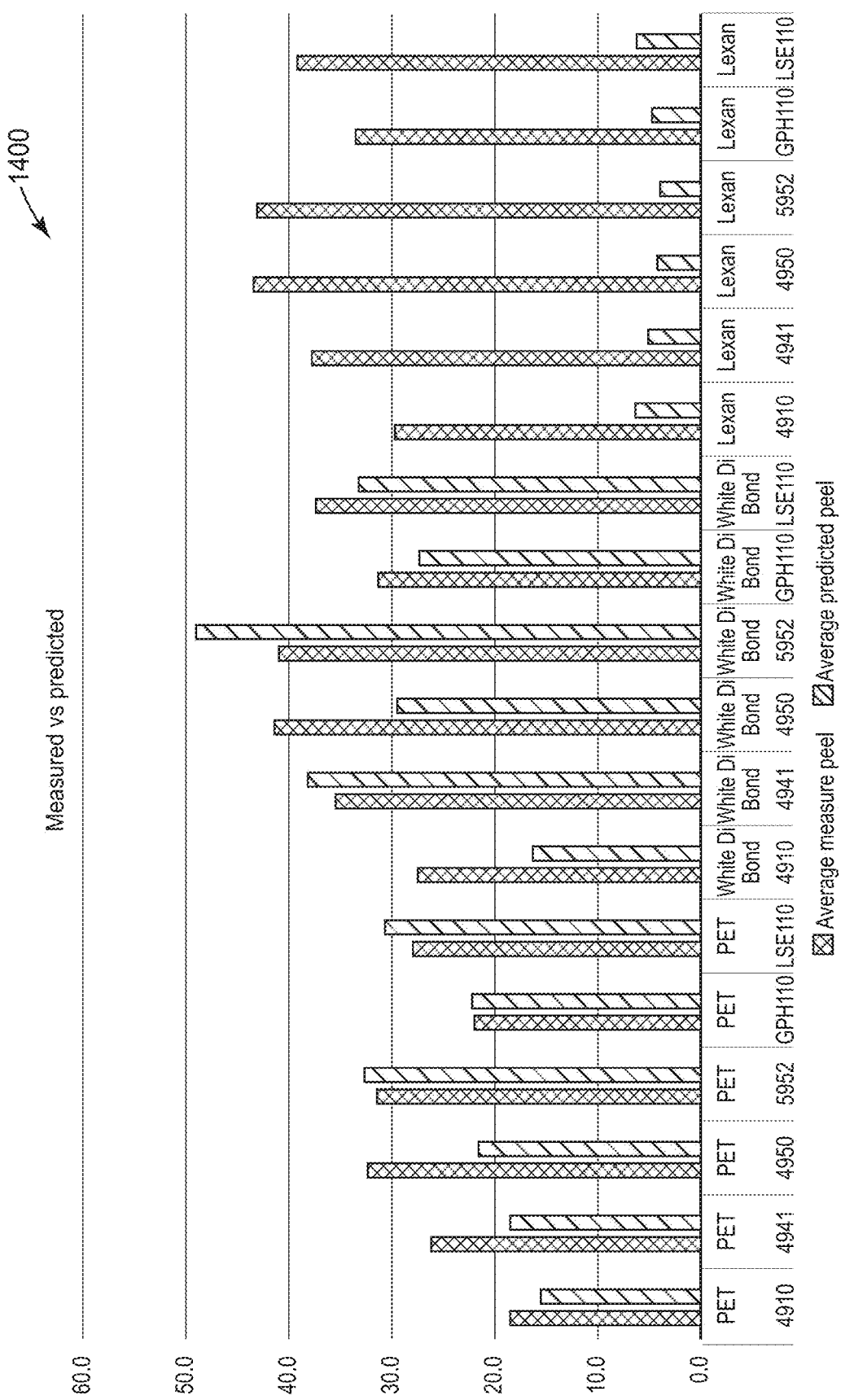
FIG. 14 is a chart illustrating the average measured peel versus the average predicted peel for a variety of substrate/adhesive combinations.

FIG. 14 is a chart illustrating the average measured peel versus the average predicted peel for a variety of substrate/adhesive combinations. As illustrated, the predictive model was fairly accurate using the developed dataset. However, the Lexan samples 1400 show that the predictive model 1320 was confused by a similar type of chemistry when compared to the reference. Such inaccuracy in the predictive model 1320 may be improved over time by using more samples to build the predictive model 1320. In this example, the adhesive product with the desired peel strength value for the substrate would be selected.

Industrial Engineering Application Example—Product Recommender for Abrasive Belts Abrasive belts are offered in a wide range of constructions (e.g., backing, mineral type and size, etc.) for different applications and pressure regimes. In order to offer a tool for global application engineers, sales force and customers, the predictive modeling techniques described herein may be used to develop a table to group 'process-substrate-machine' and match them with the agreed upon product recommendations. As with the other examples, the predictive modeling process starts by building a predictive model to predict the best product recommendation for a specific customer situation (process-substrate-machine).

The product finder/recommender logic is based on multivariate analytics to provide continuous refinement of the predictions as soon as new user data is added to the base data set. As in the above examples, a predictive model is built based on existing user data from product developer & application engineers (and customers). The predictive model determines and recommends the next best (closest matching) product based on the 'distance' between the customer need and the existing product portfolio offering. In sample embodiments, the product finder is web-based and is accessible by computers and other hand-held processing devices such as tablets, laptops, smartphones, etc. In sample embodiments, the product finder is implemented on a common architecture for recommender systems to provide standardized functionality.

Figure 16A:
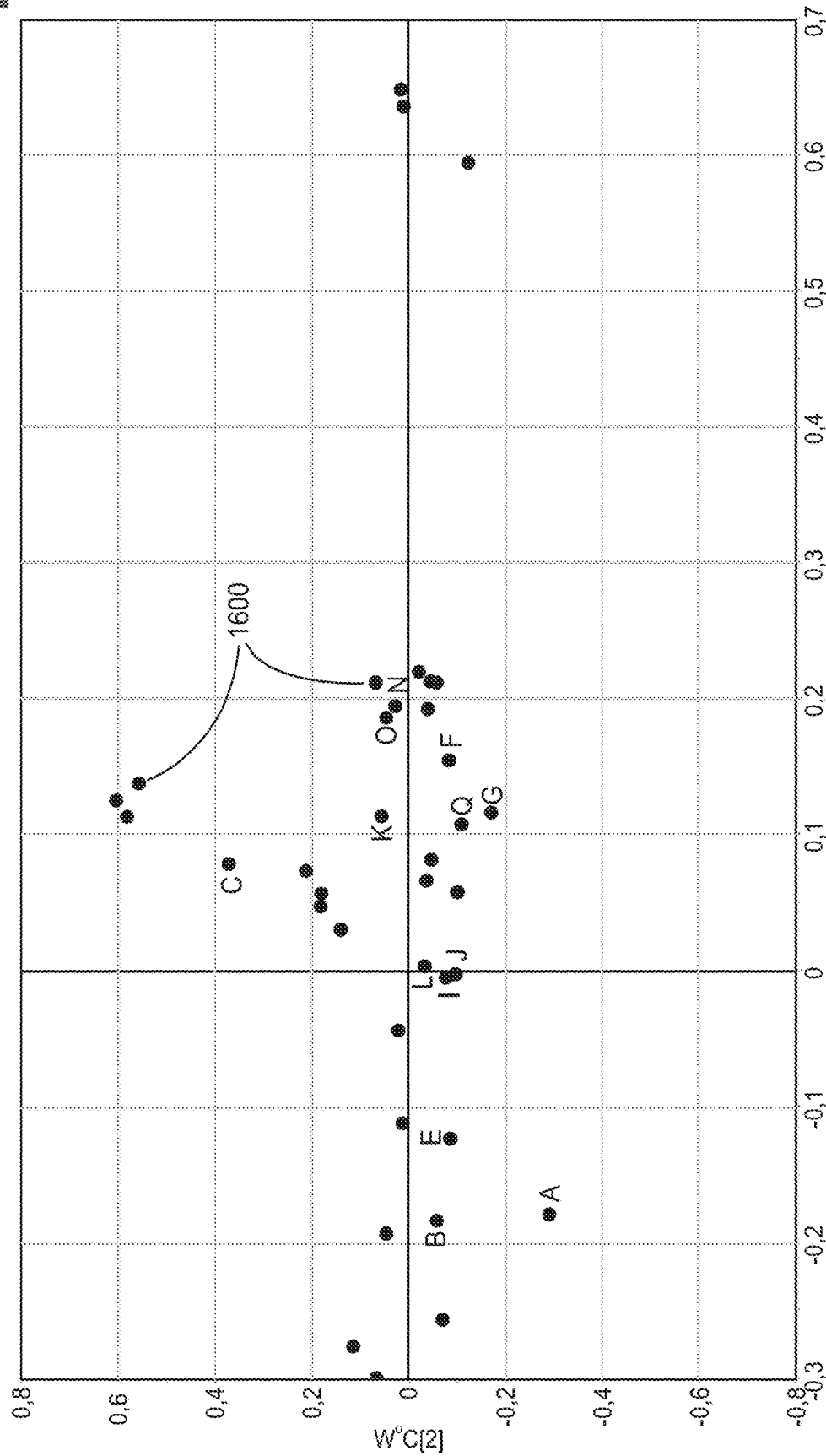
FIGS. 16A-16B are loadings plots illustrating the information gathered in FIG. 15 converted into loadings plots for the recommended products for different machines/substrates, where
Figure 16B:
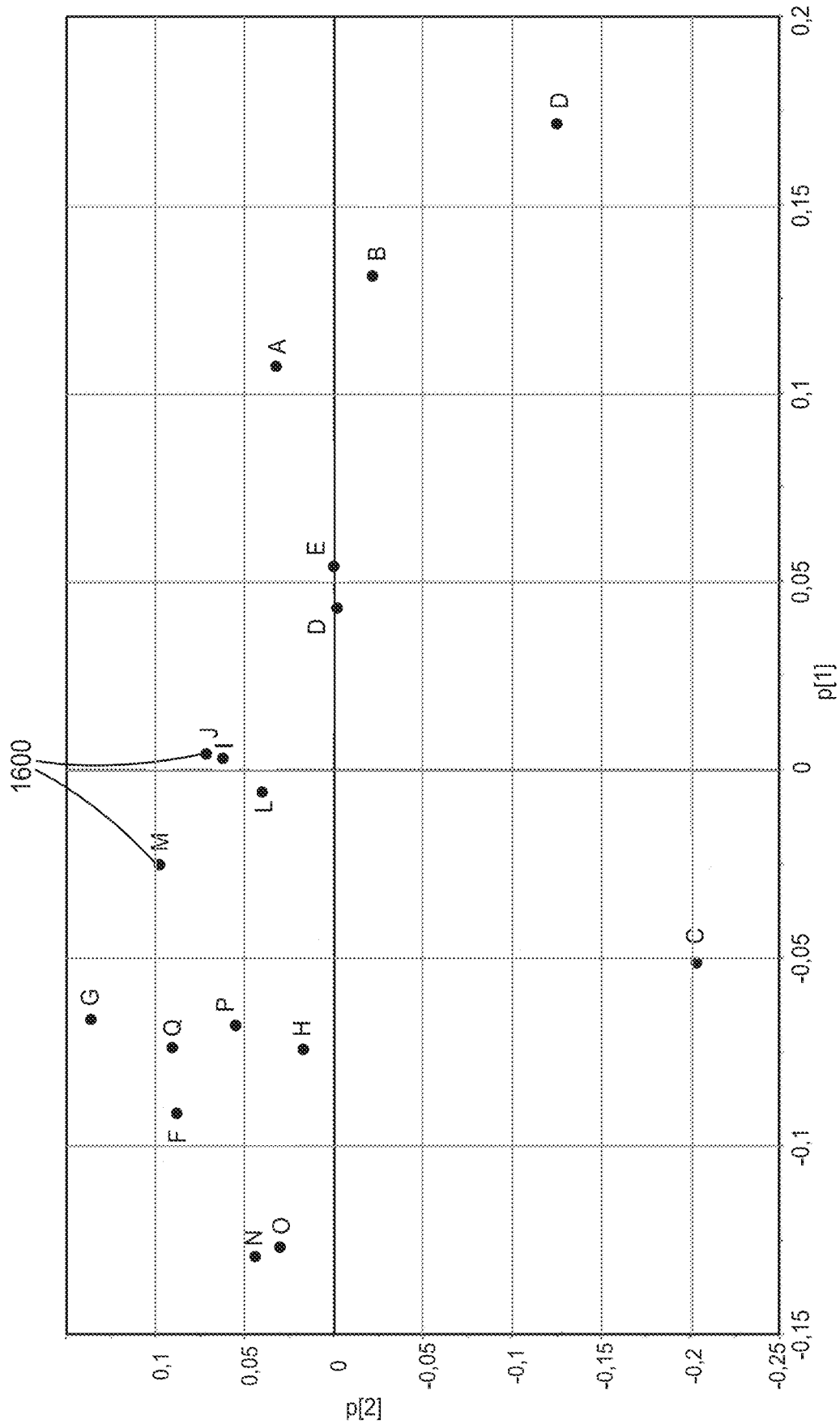

FIG. 15 illustrates a chart 1500 of sample abrasive belts by application-substrate-machine. FIG. 15 shows the applications 1510 and typical grades 1520 along the left-hand side of the chart 1500 and the substrate 1530 and machine 1540 along the top of the chart 1500 as determined by the predictive model. In FIG. 15, the cells 1540 in chart 1500 are displayed in different colors to identify the best value options based on experimentation, the best options for applications that may struggle to show value, applications that are considered an unlikely application for the indicated machine/substrate, and applications that are not possible, so no recommendation is made. The rankings thus illustrate the tool with the highest performance for each combination of application and substrate. FIGS. 16A-16B are loadings plots illustrating the information gathered in FIG. 15 converted into loadings plots for the recommended products 1600 for different machines/substrates, where FIG. 16B is a zoomed in version of FIG. 16A.

Figure 17B:
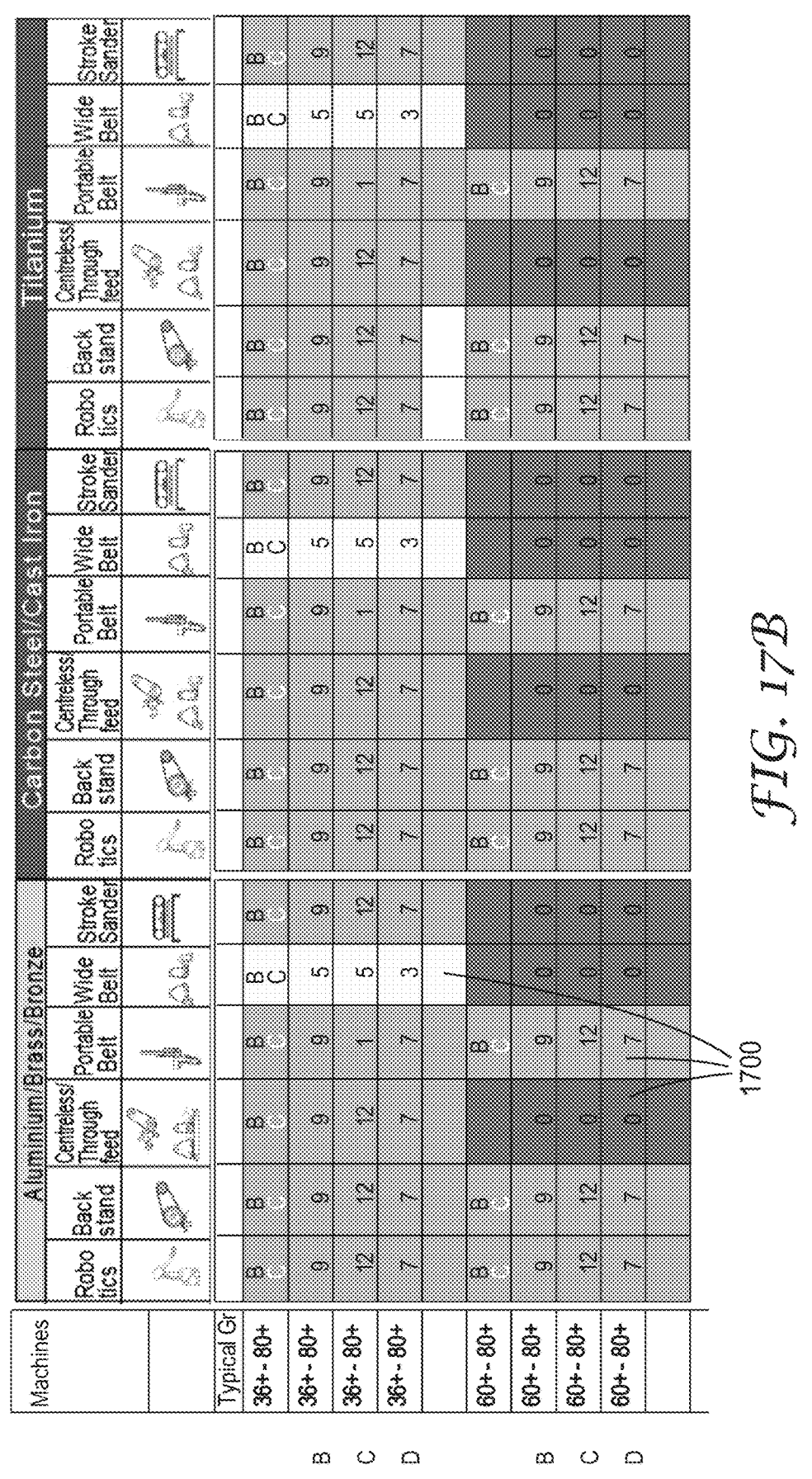

FIGS. 17A-17B are charts illustrating the qualitative information from FIG. 15 converted into numerical 'rankings' indicating suitability of a given machine/substrate for a particular application on a scale of 1-12.

Figure 18:
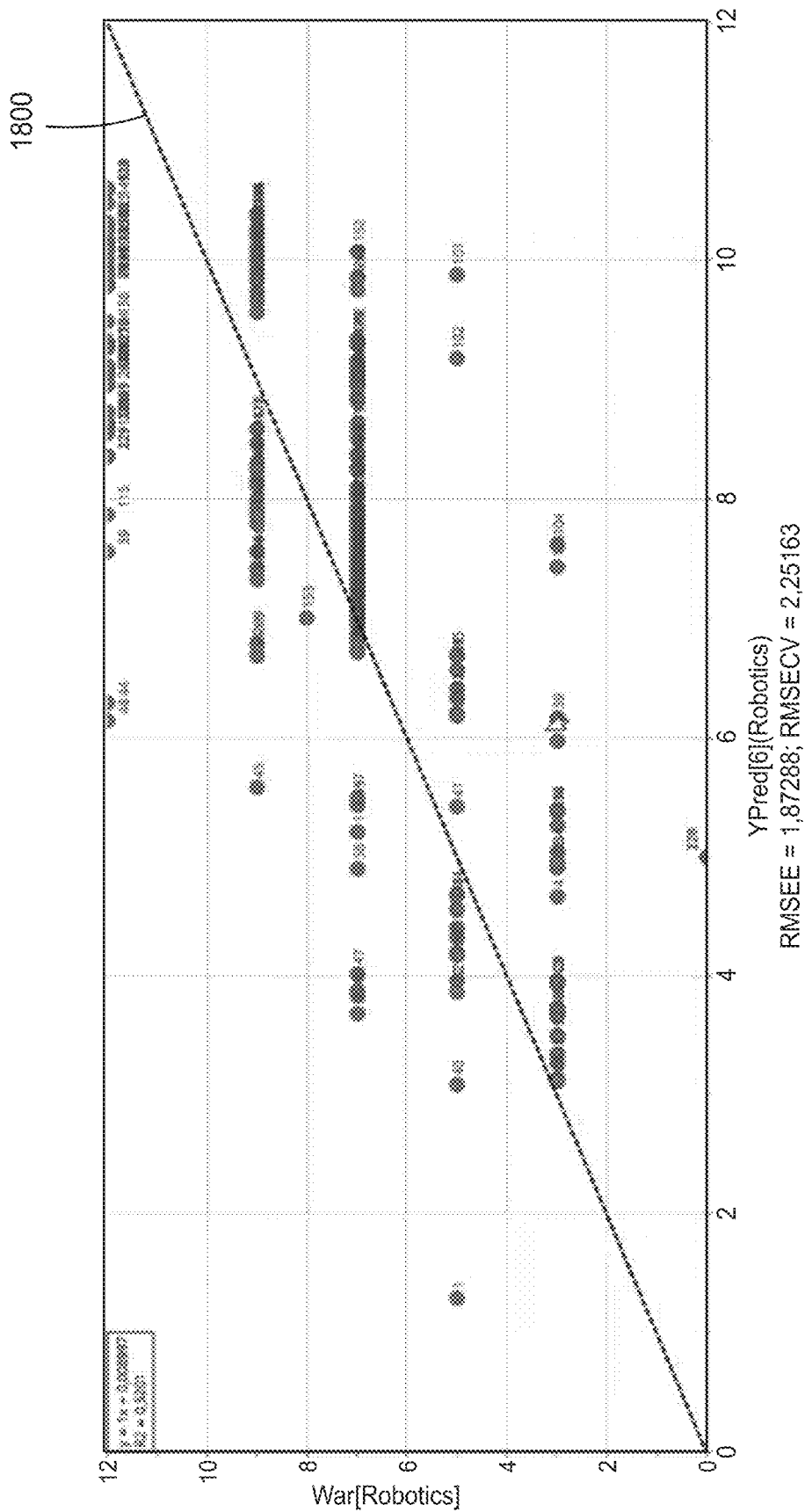
FIG. 18 is a plot illustrating the observed versus predicted belt applications for robotic applications.

FIG. 18 illustrates a graph of the observed versus predicted belt applications for a particular application, in this case, robotic applications. As illustrated in FIG. 18 for robotic applications, the best observed versus prediction results are provided for the machine/substrate/applications that fall on the line 1800.

Figure 19:
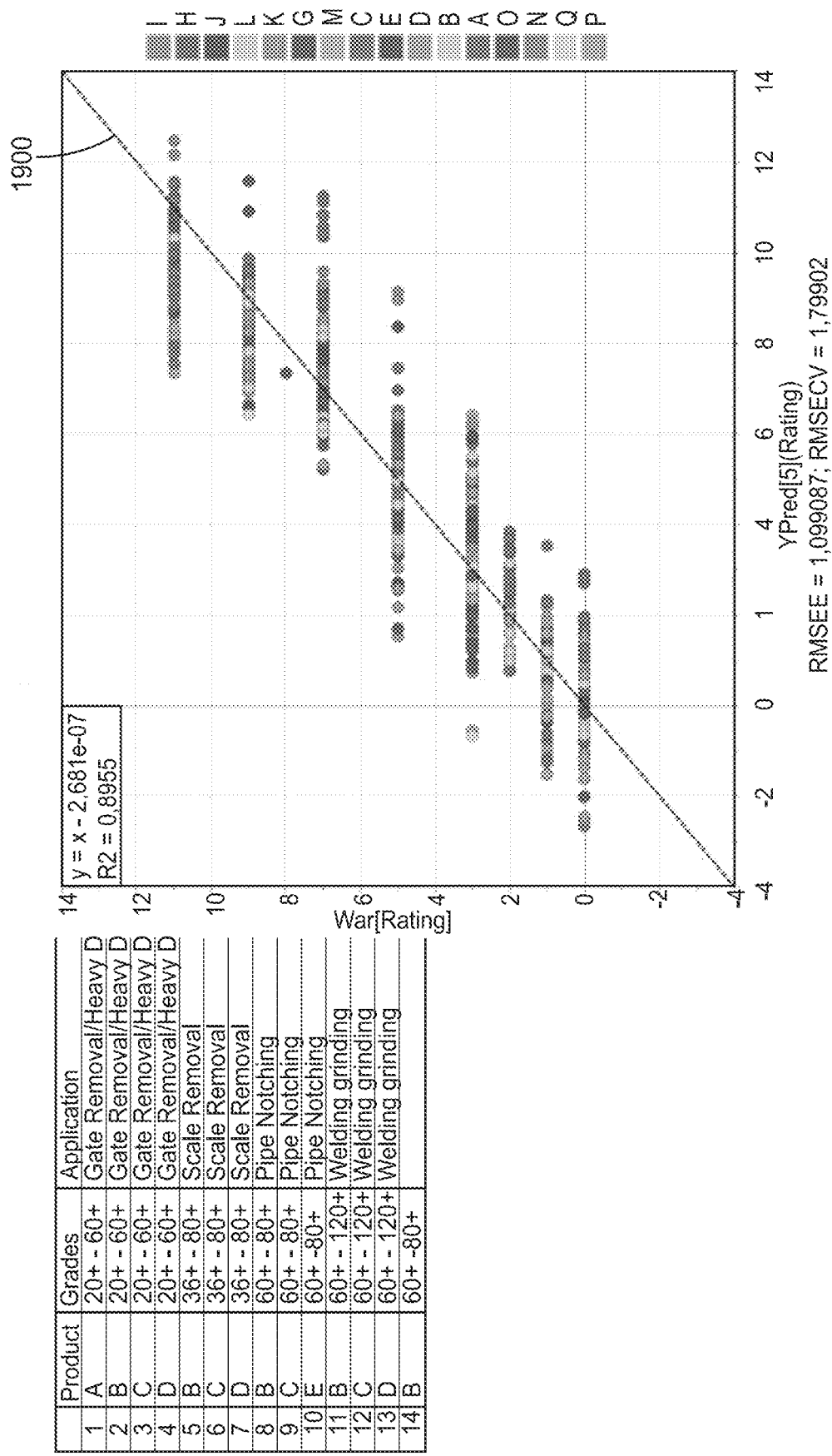
FIG. 19 is a plot illustrating the observed versus predicted belt applications by machine (and pressure).

As a next step, the pressure was considered (high-medium-low), as well as the contact wheel, where the pressure is correlated to machine type. FIG. 19 illustrates a graph of the observed versus predicted belt applications by machine (and pressure) where, once again, the best observed versus prediction results are provided for the machine/substrate/applications that fall on the line 1900. FIGS. 20A-20B are charts illustrating the refined numerical rankings for the refined data (taking pressure into account).

FIG. 21 is a chart illustrating the performance ratings 2100 for robotics machine applications 2110 and products 2120. In FIG. 21, the pressure is also correlated to machine type.

Figure 22:
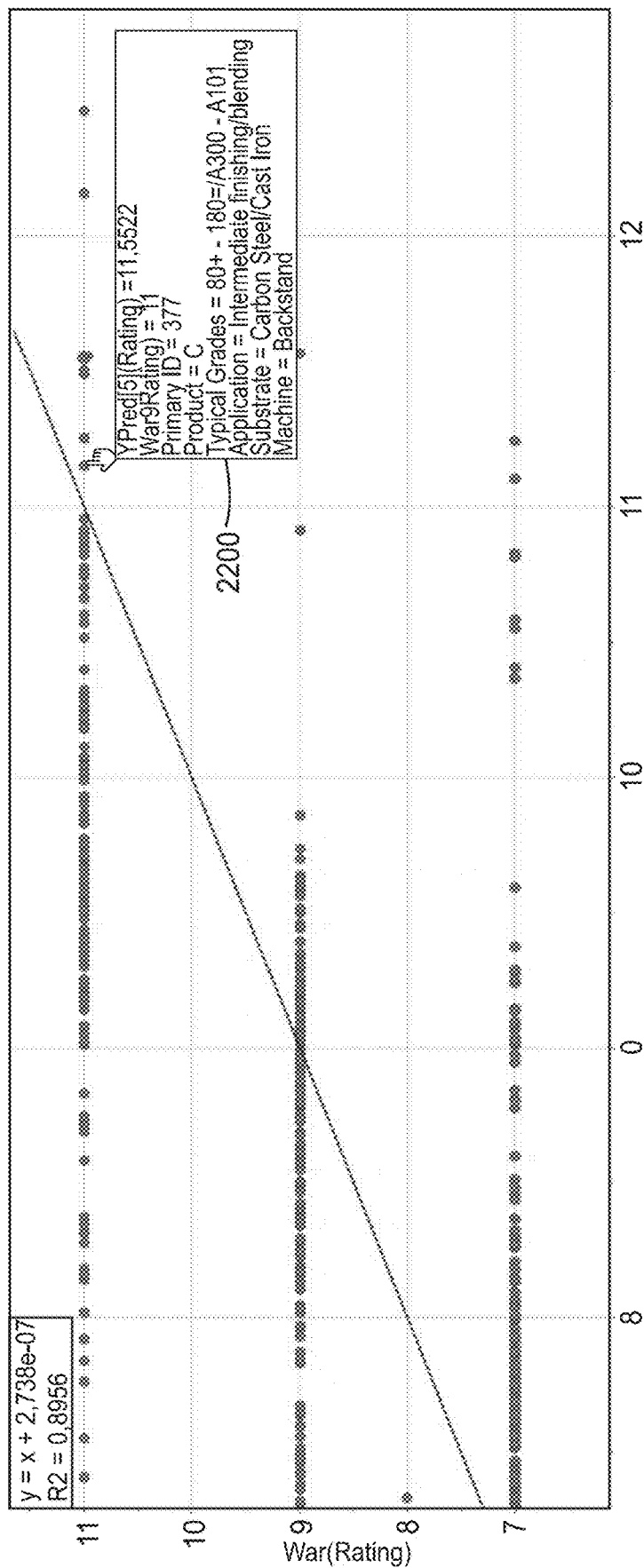
FIG. 22 is a plot illustrating the observed versus predicted results for a particular Product-Application-Machine/Pressure to provide a corresponding performance rating.
Figure 23:
FIG. 23 is a table illustrating the modeled rating based on numerical rating and shows that the information from each predicted data point may be reviewed.

FIG. 22 illustrates a graph of the observed versus predicted results for a particular Product-Application-Machine/Pressure to provide a corresponding performance rating. For example, the highest rating for weld cleaning and through-feed is predicted for the circled example 2200 provided at the right-hand side of the chart. To confirm if the predictions align with actual experience, the information from FIG. 22 may be converted into a table for review by the application engineer. For example, FIG. 23 is a chart illustrating the modeled rating based on numerical rating and shows that the information from each predicted data point may be reviewed. For example, the arrow 2300 shows the predicted ratings. Such use of the data from the consumer will increase productivity by helping the customer to analyze the available data.

It will be appreciated that the product recommender may be separated into three phases: product finder/recommender, R&D design tool, and product selector and sales guide. In sample embodiments, the application engineer uses the product recommender to identify the appropriate abrasive belt for a particular application. For different markets, changes to specific terms not used in that market may be identified to adjust the product recommender as appropriate. On the other hand, the product recommender may be used by customers to identify which product to choose based on the machine, substrate and process being operated by the customer. In the R&D design tool phase, the test data from the abrasive belt manufacturing process may be collected and used to predict the products that will provide the best results. The product selector may further be applied to sales data collected and/or reported during the sales process to recommend the best product based on, e.g., a Finish-Application-Substrate-Tool (FAST).

Product Portfolio Rationalization Example—Portfolio Optimizer and Product Recommender for Safety Harness Products The following embodiment offers an example of how the predictive modeling tool described herein may be used as a tool for product portfolio rationalization, white space identification, and product recommendation. As in the above embodiments, a multivariate analysis tool is used to analyze data generated from safety harness product offerings and used to assist the business organization with portfolio rationalization by enabling visualization of groups of products of similar performance or characteristics. Though described with respect to safety harness products, it will be appreciated the techniques described herein may be used with any of a number of products where there is a variety of product offerings with similar and potentially overlapping characteristics. The same techniques may be used to simplify product portfolios and may be further used to develop a product selector/recommender as in the abrasive belts embodiment described above.

This embodiment addresses the situation where, for a variety of reasons, a company may provide many products (e.g., fall protection products) available under multiple brands and legacy businesses that offer products with overlapping features. In such situations, it is often difficult for application engineers and customers to know which product is most suitable for a specific application requirement. On the other hand, it would be very beneficial for the business organization to understand which products may be grouped together in an effort to prepare for a global product portfolio rationalization.

As in the other embodiments, the process starts by collecting product data for the predictive modeling process. For example, as illustrated in FIG. 24, a product list may contain potentially hundreds of products with potentially thousands of stock keeping units (SKUs) worldwide. It will be appreciated that the more SKUs, the more helpful the predictive modeling tool is for providing product portfolio rationalization. In the example of FIG. 24, qualitative harness data 2400 is provided. In this example, the absence of quantitative data allows for product grouping based on criteria such as application, harness Type, D-ring Location, and buckle type or other criteria that are qualitatively significant for differentiating the product.

Figure 25:
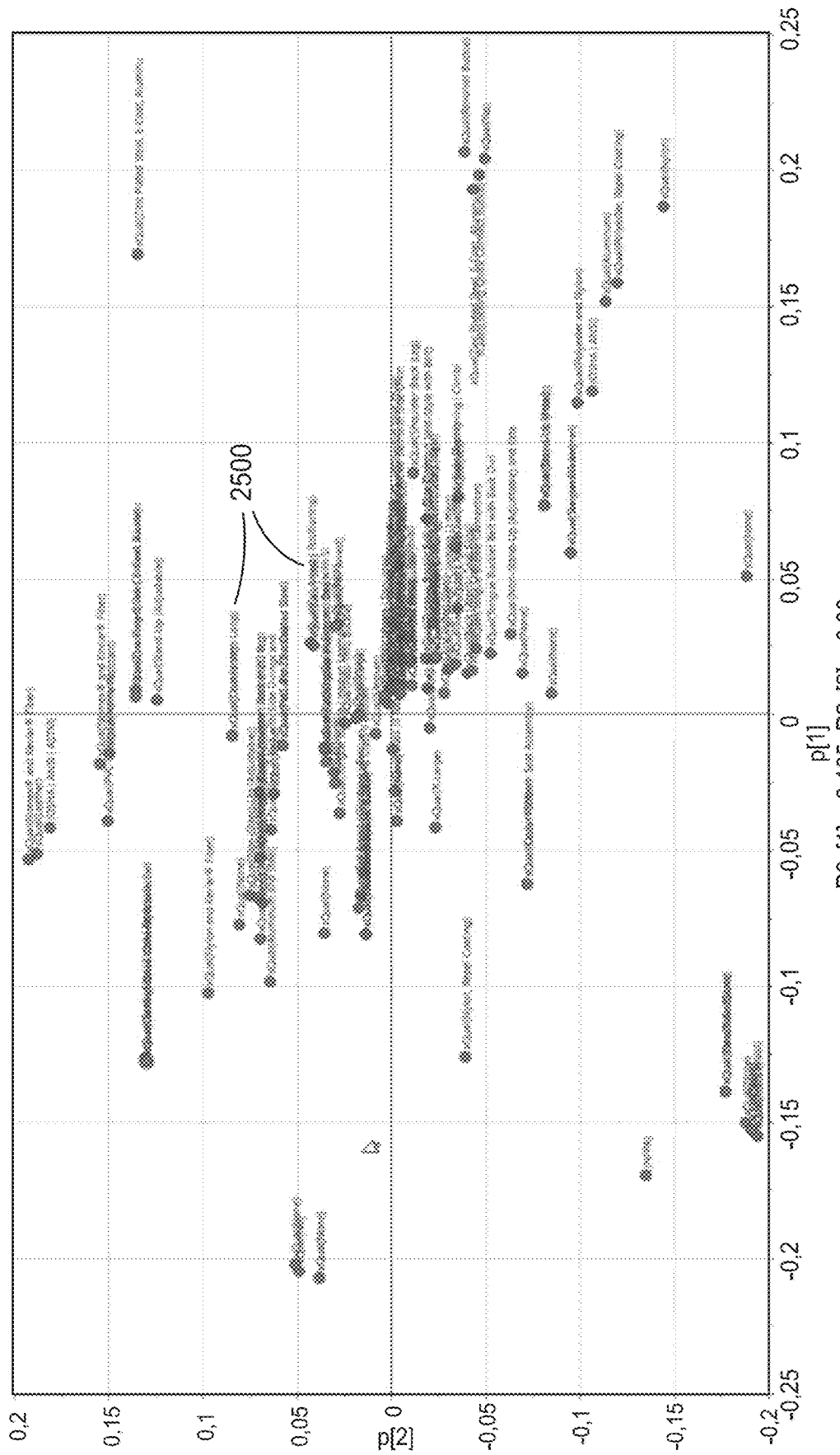
FIG. 25 is a plot illustrating a preliminary predictive model of the harness data of FIG. 24 as generated using a multivariate statistical analysis tool that plots the correlations among the collected parameters.

FIG. 25 is a plot illustrating a preliminary predictive model of the harness data of FIG. 24 as generated using the multivariate statistical analysis tool Simca by Umetrics that plots the correlations 2500 among the collected parameters. To provide a visualization of the product groupings, 14 settings were defined with a random generator. FIG. 25 illustrates the outcome as the visualization of product groupings with similar features and properties. Using a 'harness scoring', the model scores the closest product model that fits the predictive model for the identified settings. If one product does not have 100% fit, the predictive model will show the closest fit. Then, once several product groups are clustered together, the clustered data may be evaluated to identify the top N closest harnesses. Those product groupings may be used to identify product clusters of similar properties, enabling meaningful portfolio rationalization. On the other hand, for a product recommender, it may be more important to limit the selection criteria to a manageable number, for if customers have too many options, they may stop looking for a product.

This embodiment thus uses the predictive modeling tool to identify gaps and overlaps in product lines by monitoring the fit of the output of the predictive model to the input feature parameters. Analyzing the variables and the order in which the variables were selected by a customer may be utilized to understand customer preferences/choices.

Enabling customer selection of a safety product also brings in other considerations. For example, it may be required by regulations, etc. to warn a user that the selected safety product may not be a perfect match for particular applications. In such cases, key performance criteria may need to be the key considerations for safety products before other features are taken into account. A mandatory field may need to be added to the product data indicating for which standard a product is approved and to limit selection of that product to the applications under the identified standard. Also, the product recommender may highlight areas of greater concern for a particular application of a product. For example, a product color may be less important than arc flash rating/high energy discharge and other features critical to safety to trigger a warning. For example, the selection of a particular product for a particular application may pop up a notification: 'This selection matches the selected safety critical variables by only 90%, not 100%, less than perfect match.' The product recommender thus enables the vendor to identify and to fill gaps in its product portfolio and to offer custom products while reducing liability to its customers or vendors.

The systems and methods described herein thus implement multivariate statistical analysis and machine learning techniques to predict performance of industrial products from simple to increasingly complex data files identifying the product characteristics and desired outcomes or features for particular applications of the industrial products. The predictive modeling tool may be used by customers to search for the appropriate product for a particular application and by companies to recommend products for particular applications as well as to rationalize product portfolios to find holes/overlaps in product offerings. These and other applications will be apparent to those skilled in the art from the above descriptions of illustrative embodiments.

Computer Embodiment

Figure 26:
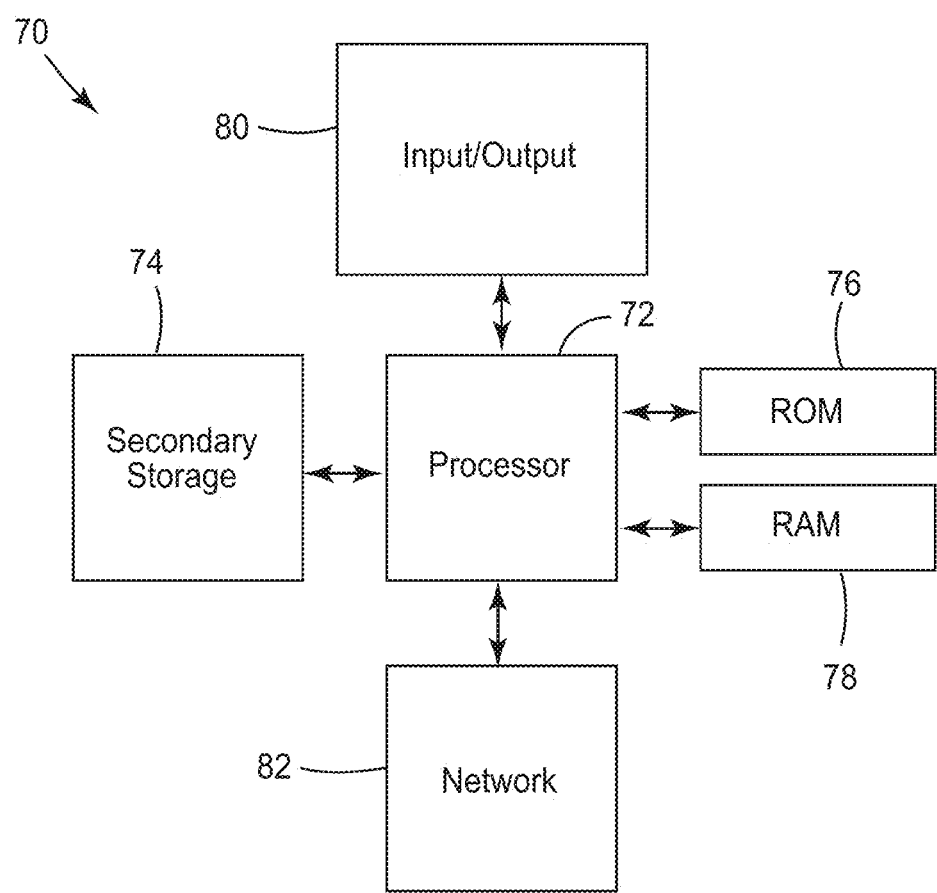
FIG. 26 illustrates a general-purpose computer that may be programmed into a special purpose computer suitable for implementing one or more embodiments of the system described in sample embodiments.

FIG. 26 illustrates a typical, general-purpose computer that may be programmed into a special purpose computer suitable for implementing one or more embodiments of the system disclosed herein. The controllers 16 and 20 and machine learning tool 24 described above may be implemented on any general-purpose processing component, such as a computer with sufficient processing power, memory resources, and communications throughput capability to handle the necessary workload placed upon it. The processing component 70 includes a processor 72 (which may be referred to as a central processor unit or CPU) that is in communication with memory devices including secondary storage 74, read only memory (ROM) 76, random access memory (RAM) 78, input/output (I/O) devices 80, and network connectivity devices 82. The processor 72 may be implemented as one or more CPU chips or may be part of one or more application specific integrated circuits (ASICs).

The secondary storage 74 is typically comprised of one or more disk drives or tape drives and is used for non-volatile storage of data and as an over-flow data storage device if RAM 78 is not large enough to hold all working data. Secondary storage 74 may be used to store programs that are loaded into RAM 78 when such programs are selected for execution. The ROM 76 is used to store instructions and perhaps data that are read during program execution. ROM 76 is a non-volatile memory device that typically has a small memory capacity relative to the larger memory capacity of secondary storage 74. The RAM 78 is used to store volatile data and perhaps to store instructions. Access to both ROM 76 and RAM 148 is typically faster than to secondary storage 74.

The devices described herein may be configured to include computer-readable non-transitory media storing computer readable instructions and one or more processors coupled to the memory, and when executing the computer readable instructions configure the processing component 70 to perform method steps and operations described above with reference to FIG. 1 to FIG. 25. The computer-readable non-transitory media includes all types of computer readable media, including magnetic storage media, optical storage media, flash media and solid-state storage media.

It should be further understood that software including one or more computer-executable instructions that facilitate processing and operations as described above with reference to any one or all of steps of the disclosure may be installed in and sold with one or more servers and/or one or more routers and/or one or more devices within consumer and/or producer domains consistent with the disclosure. Alternatively, the software may be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software may be stored on a server for distribution over the Internet, for example.

Also, it will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention may be implemented, at least in part, in digital electronic circuitry, analog electronic circuitry, or in computer hardware, firmware, software, or in combinations of them. These components may be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. Also, functional programs, codes, and code segments for accomplishing the present invention may be easily construed as within the scope of the invention by programmers skilled in the art to which the present invention pertains. Method steps associated with the illustrative embodiments of the present invention may be performed by one or more programmable processors executing a computer program, code or instructions to perform functions (e.g., by operating on input data and/or generating an output). Method steps may also be performed by, and apparatus of the invention may be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory may be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The above-presented description and figures are intended by way of example only and are not intended to limit the illustrative embodiments in any way except as set forth in the appended claims. It is noted that various technical aspects of the various elements of the various exemplary embodiments that have been described above may be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments but may be modified within the scope of appended claims, along with their full scope of equivalents.

What is claimed is:

1. A computer-implemented method of implementing predictive modeling, comprising:
   a computer performing multivariate analysis of input variables relating to characteristics of products and output variables relating to performance of the products to generate a data model of the products, the data model representing contributions to changes in the output variables by the respective input variables;
   providing the data model to a predictive algorithm to identify parameter values for input variables expected to have a most significant impact on selected output variables, the predictive algorithm outputting the parameter values, wherein the data model comprises the computer automatically generating a Design of Experiments (DoE) design for an input variable space of the industrial process, processing an experimental design using the data model and storing results based on preferred outcome, further comprising the predictive algorithm making predictions of a predetermined number of best next trials for the DoE and outputting parameter values for the predetermined number of best next trials and probabilities of improved results using the parameter values;
   providing the parameter values as the input variables to optimize the selected output variables; and
   recommending a product that optimizes the selected output variables for specified input variables.

2. The method of claim 1, further comprising identifying products in a portfolio of products that have overlapping parameter values that optimize the same selected output variables.

3. The method of claim 1, further comprising identifying gaps in a portfolio of products by identifying parameter values that are not represented in the portfolio of products for optimizing the selected output variables.

4. The method of claim 1, wherein the input variables comprise characteristics of at least one of a grinding machine, a bonded abrasive grinding wheel, an abrasive belt, coated abrasive belts or disks, non-woven abrasives, bristle brushes, robot-mounted abrasive articles, an adhesive, and a safety harness.

5. The method of claim 1, wherein the input variables include process variables of an industrial process and the output variables include results from operation of the industrial process, and the data model represents contributions to changes in the output variables by the respective input or process variables, wherein the parameter values are provided as the input or process variables to the industrial process to optimize the selected output variables.

6. The method of claim 1, wherein the industrial process is a grinding machine operation, the input variables comprising machine settings for a grinding machine and the output variables depend on a type of grinding process and comprise at least one of G-ratio, material removal rate of a grinding wheel, chip thickness, pieces per dressing cycle, and surface finish.

7. The method of claim 1, wherein the machine settings include at least one of grinding wheel speed, roll speed, traverse speed, continuous infeed, end infeed, grinding time, feed rate, shifting, dressing, dressing infeed, infeed, and overlap ratio.

8. The method of claim 1, wherein the industrial process is an adhesive selection process, the input variables comprising selection variables for an adhesive or tape and the output variables comprising a selection or recommendation of at least one adhesive or tape.

9. The method of claim 8, wherein the input variables include at least one of adhesive physical characteristics, adhesive thermal characteristics, adhesive electrical characteristics, adhesive curing characteristics, adhesive performance characteristics, adhesive durability characteristics, adhesive chemical resistance characteristics, adhesive rheological characteristics, adhesive viscosity, adhesive setting time, adhesive modulus of elasticity, adhesive solvent resistance, adhesive composition, adhesive dispensing characteristics, adhesive use requirements, standardized tests or certifications, environmental parameters, health parameters, safety parameters, carrier characteristics, backing characteristics, liner characteristics, and materials to be bonded by the adhesive or tape.

10. The method of claim 8, wherein the output variables include at least one of tensile strength, peel strength value, adhesive name, adhesive structural characteristics, adhesive performance characteristics, quantification of quality of fit, and purchasing information.

11. The method of claim 1, wherein the industrial process is a grinding operation, further comprising recommending a product that optimizes the selected output variables in the industrial process for at least one of a specified machine, a specified substrate, and a specified application of an abrasive belt.

12. A system that implements predictive modeling to select a product for an industrial process, comprising:
   at least one processor; and
   a non-transitory memory storing instructions that when executed by the at least one processor cause the at least one processor to perform operations comprising:
      retrieving input variables relating to characteristics of a set of products;

retrieving output variables relating to performance of each of the set of products;

generating a data model of the products, the data model representing contributions to changes in the output variables by the respective input variables;

performing multivariate analysis of the input variables and output variables to generate a data model of the operation of the industrial process, and the data model representing contributions to changes in the output variables by the respective input variables;

automatically generating a Design of Experiments (DoE) design for an input variable space of the industrial process;

processing an experimental design using the data model;

providing results of the processing the experimental design based on preferred outcome to a predictive algorithm;

the predictive algorithm identifying parameter values for input variables expected to have a most significant impact on selected output variables during performance of the industrial process, making predictions of a predetermined number of best next trials for the DoE, and outputting parameter values for the predetermined number of best next trials and probabilities of improved results using the parameter values;

providing the parameter values as the input variables to the industrial process to optimize the selected output variables; and recommending a product that optimizes the selected output variables for specified input variables; and a controller that generates a graphics interface that comprises the product recommendation.

13. The system of claim 12, wherein the at least one processor recommending the product further comprises the at least one processor performing operations comprising recommending the product that optimizes the selected output variables in the industrial process for at least one of a specified machine, a specified substrate, and a specified application.

14. The system of claim 12, wherein the at least one processor further performs operations comprising identifying products in a portfolio of products that have overlapping parameter values that optimize the same selected output variables.

15. The system of claim 12, wherein the at least one processor further performs operations comprising identifying gaps in a portfolio of products by identifying parameter values that are not represented in the portfolio of products for optimizing the selected output variables.

* * * * *